(12) United States Patent
Kato

(10) Patent No.: US 7,180,623 B2
(45) Date of Patent: Feb. 20, 2007

(54) METHOD AND APPARATUS FOR PRINT ERROR RECOVERY

(75) Inventor: Kazunori Kato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 10/304,954

(22) Filed: Nov. 27, 2002

(65) Prior Publication Data

US 2003/0103236 A1   Jun. 5, 2003

(30) Foreign Application Priority Data

Dec. 3, 2001  (JP)  ............................ 2001-368996
May 31, 2002  (JP)  ............................ 2002-160393

(51) Int. Cl.
*G06F 15/00* (2006.01)
*G06K 1/00* (2006.01)

(52) U.S. Cl. ........................... 358/1.15; 714/2; 709/203

(58) Field of Classification Search ............... 358/1.15, 358/1.12, 1.16, 1.13, 1.14, 2.1; 709/203, 709/223; 710/15; 714/2; 399/19
See application file for complete search history.

(56) References Cited

U.S. PATENT DOCUMENTS

| | | | |
|---|---|---|---|
| 5,548,375 A | | 8/1996 | Mitsuya et al. ................. 399/9 |
| 5,625,757 A | * | 4/1997 | Kageyama et al. ......... 358/1.14 |
| 5,740,028 A | * | 4/1998 | Sugiyama et al. ........... 725/149 |
| 5,845,057 A | * | 12/1998 | Takeda et al. .............. 358/1.15 |
| 6,567,621 B2 | * | 5/2003 | Miyoshi et al. ............... 399/19 |
| 6,661,978 B2 | * | 12/2003 | Brewington .................. 399/19 |
| 6,786,288 B2 | * | 9/2004 | Singh .......................... 175/353 |
| 6,809,831 B1 | * | 10/2004 | Minari ....................... 358/1.15 |
| 6,856,416 B1 | * | 2/2005 | Danknick ................... 358/1.15 |
| 6,941,865 B2 | * | 9/2005 | Kato ........................... 101/484 |
| 7,039,354 B2 | * | 5/2006 | Miyake ....................... 399/390 |
| 7,061,635 B1 | * | 6/2006 | Wanda et al. .............. 358/1.15 |
| 2002/0163666 A1 | * | 11/2002 | Iwata et al. ................ 358/1.15 |

(Continued)

FOREIGN PATENT DOCUMENTS

EP    0 982 650 A1    3/1996

(Continued)

OTHER PUBLICATIONS

Office Action in JP 2001-368996.

*Primary Examiner*—Kimberly Williams
*Assistant Examiner*—Dillon Murphy
(74) *Attorney, Agent, or Firm*—Fitzpatrick, Cella, Harper & Scinto

(57) ABSTRACT

An information processing apparatus which generates print data includes a range setting module which sets the print range of each printer in order to distribute a print job to a plurality of printers and perform print processing, a recognition module which recognizes generation of an error in processing of each print range together with an error generation page within the print range when printing is performed in accordance with the set print range, a determination module which determines a re-print start page within the print range in accordance with the print attribute and error generation page of the print job within the print range that is interrupted by generation of the error, and a data transfer module which transfers print data of a re-print range specified by the determined re-print start page to a substitute printer which performs re-printing of the interrupted print range, and causes the substitute printer to execute re-printing.

6 Claims, 26 Drawing Sheets

AUTOMATIC RE-PRINT SETTINGS

| OUTPUT DESTINATION PRINTER | PRIORITY |
|---|---|
| PRINTER A | 1 |
| PRINTER B | 2 |

U.S. PATENT DOCUMENTS

2003/0076522 A1* 4/2003 Simpson et al. .......... 358/1.14
2004/0080779 A1* 4/2004 Kawamoto ................ 358/1.14

FOREIGN PATENT DOCUMENTS

| | | |
|---|---|---|
| JP | 07-072993 A | 3/1995 |
| JP | 07-256984 | 10/1995 |
| JP | 08-234630 A | 9/1996 |
| JP | 09-101868 | 4/1997 |
| JP | 09-150566 | 6/1997 |
| JP | 09-231034 | 9/1997 |
| JP | 10-011242 | 1/1998 |
| JP | 10-049314 | 2/1998 |
| JP | 10-063447 | 3/1998 |
| JP | 10-112774 A | 4/1998 |
| JP | 10-136143 | 5/1998 |
| JP | 10-278395 A | 10/1998 |
| JP | 10-301737 | 11/1998 |
| JP | 11-212760 A | 8/1999 |
| JP | 11-327856 | 11/1999 |
| JP | 2000-035867 | 2/2000 |
| JP | 2000-259378 | 9/2000 |
| JP | 2000-20273 A | 12/2000 |
| JP | 2001-290630 | 10/2001 |
| JP | 2004-005245 | 1/2004 |
| WO | WO97/36226 | 10/1997 |

* cited by examiner

FIG. 2

| AUTOMATIC RE-PRINT SETTINGS | |
|---|---|
| OUTPUT DESTINATION PRINTER | PRIORITY |
| PRINTER A | 1 |
| PRINTER B | 2 |

FIG. 11A

| NO | ATTRIBUTE INFORMATION | | REMARKS |
|---|---|---|---|
| 1 | PRINTING METHOD | SINGLE-SIDED/DOUBLE-SIDED / BOOKBINDING PRINTING | |
| 2 | PAPER SIZE | ORIGINAL SIZE / FIXED SIZE | · Z-FOLD IS DESIGNATED WHEN "A4+A3", "B4+B3", OR "LETER+LEDGER (11×17)" IS DESIGNATED.<br>· ORIGINAL SIZE OF FIRST CHAPTER/PAGE IS AUTOMATICALLY SELECTED WHEN BOOKBINDING PRINTING OR N-up PRINTING IS DESIGNATED. |
| 3 | PAPER DIRECTION | PORTRAIT / LANDSCAPE | · SELECTABLE ONLY FOR FIXED SIZE. |
| 4 | BINDING MARGIN / BINDING DIRECTION | | · SHIFT/ENLARGEMENT & REDUCTION CAN BE DESIGNATED. |
| 5 | N-up PRINTING | NUMBER OF PAGES / LAYOUT ORDER / BOUNDARY / LAYOUT POSITION, etc. | · LAYOUT POSITION: NINE PATTERNS.<br>· X1 PRINTING CAN BE DESIGNATED. |
| 6 | ENLARGEMENT / REDUCTION | ON / OFF | ON/OFF CAN BE AUTOMATICALLY DESIGNATED WHEN PAPER SIZE IS FIXED SIZE OR N-up PRINTING IS SELECTED. |
| 7 | WATERMARK | | · WATERMARK CAN BE DESIGNATED INDIVIDUALLY IN LOGICAL OR PHYSICAL PAGES.<br>· ALL CHAPTERS / PAGES ARE TARGETED. |

FIG. 11B

| | | |
|---|---|---|
| 8 | HEADER / FOOTER | • HEADER/FOOTER CAN BE DESIGNATED INDIVIDUALLY IN LOGICAL OR PHYSICAL PAGES.<br>• ALL CHAPTERS/PAGES ARE TARGETED. |
| 9 | DISCHARGE METHOD | STAPLE / PUNCH HOLE | • STAPLING/PUNCHING ONLY IN SINGLE-/DOUBLE-SIDED PRINTING<br>• STAPLING AT ONE/TWO PORTIONS |
| 10 | DETAILS OF BOOLBINDING | OPENING DIRECTION / SADDLE STITCH / ENLARGEMENT & REDUCTION DESIGNATION / BINDING MARGIN / FASCICLE DESIGNATION, etc. | • ONLY IN BOOKBINDING PRINTING |
| 11 | FRONT / BACK COVER | | • PRINTING IS DESIGNATED FOR 1/2 FRONT COVER OR 1/2 BACK COVER.<br>• FEED PORT (INCLUDING INSERTER) IS DESIGNATED. |
| 12 | INDEX SHEET | | • PRINTING OF CHARACTER STRING ON INDEX PORTION OR ANNOTATION ON INDEX SHEET CAN BE SET.<br>• BOOKBINDING CANNOT BE DESIGNATED. |
| 13 | SLIP SHEET | | • FEED PORT (INCLUDING INSERTER) IS DESIGNATED.<br>• ORIGINAL DATA CAN BE PRINTED ON INSERTED PAPER<br>• BOOKBINDING CANNOT BE DESIGNATED. |
| 14 | CHAPTERING | "NONE" / "PAGE BREAK" / "PAPER CHANGE" | • "PAPER CHANGE" IS FIXED WHEN INDEX SHEET OR SLIP SHEET IS DESIGNATED.<br>• "PAPER CHANGE" IN SINGLE-SIDED PRINTING |

FIG. 12

| NO | ATTRIBUTE INFORMATION | | REMARKS |
|---|---|---|---|
| 1 | PAPER SIZE | ORIGINAL SIZE / FIXED SIZE | • "PAPER CHANGE" IS AUTOMATICALLY DESIGNATED WHEN FIXED SIZE IS SELECTED.<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK. |
| 2 | PAPER DIRECTION | PORTRAIT / LANDSCAPE | • SELECTABLE ONLY FOR FIXED SIZE |
| 3 | N-up PRINTING | NUMBER OF PAGES / LAYOUT ORDER / BOUNDARY / LAYOUT POSITIONS etc. | • LAYOUT POSITION : NINE PATTERNS<br>• ×1 PRINTING CAN BE DESIGNATED. |
| 4 | ENLARGEMENT / REDUCTION | ON / OFF | • ON/OFF CAN BE AUTOMATICALLY DESIGNATED WHEN PAPER SIZE IS FIXED SIZE OR N-up PRINTING IS SELECTED. |
| 5 | WATERMARK | DISPLAY / NON-DISPLAY | • WHETHER TO DISPLAY ALL WATERMARKS DESIGNATED BY BOOK IS DESIGNATED. |
| 6 | HEADER / FOOTER | DISPLAY / NON-DISPLAY | • WHETHER TO DISPLAY ALL HEADERS/FOOTERS DESIGNATED BY BOOK IS DESIGNATED. |
| 7 | DISCHARGE METHOD | STAPLE | • STAPLE CAN BE SET OFF WHEN STAPLE IS DESIGNATED BY BOOK. DEFAULT VALUE IS "ON". |

FIG. 13

| NO | ATTRIBUTE INFORMATION | | REMARKS |
|---|---|---|---|
| 1 | PAGE ROTATION DESIGNATION | | · 0° / 90° / 180° / 270° CAN BE DESIGNATED. |
| 2 | WATERMARK | DISPLAY / NON-DISPLAY | · WHETHER TO DISPLAY ALL WATERMARKS DESIGNATED BY BOOK IS DESIGNATED. |
| 3 | HEADER / FOOTER | DISPLAY / NON-DISPLAY | · WHETHER TO DISPLAY ALL HEADERS/FOOTERS DESIGNATED BY BOOK IS DESIGNATED. |
| 4 | ZOOM | 50% - 200% | · MAGNIFICATION RELATIVE TO SIZE WHICH IS FIT IN VIRTUAL LOGICAL PAGE REGION AND SET AS 100% IS DESIGNATED. |
| 5 | LAYOUT POSITION | | · NINE FIXED PATTERNS AND ARBITRARY POSITION CAN BE DESIGNATED. |
| 6 | ANNOTATION | | |
| 7 | VARIABLE ITEM | | |
| 8 | PAGE DIVISION | | |

FIG. 20

| DISTRIBUTED PROCESSING SETTINGS | |
|---|---|
| OUTPUT DESTINATION PRINTER | RATIO |
| PRINTER A | 30% |
| PRINTER B | 70% |
| PRINTER C | 0% |

METHOD AND APPARATUS FOR PRINT ERROR RECOVERY

FIELD OF THE INVENTION

The present invention relates to an information processing apparatus and information processing method for generating print data in re-print control of a printer in a printing system.

BACKGROUND OF THE INVENTION

When printing is interrupted by a printer error or the like in a conventional printing system, the printer detects the numbers of printed pages, determines the next page as a re-print start page, and advances processing of print data. The re-print start page is set as print data, and the print data is transferred to another printer or the original printer which has recovered from the error, and the interrupted print processing continues.

In restarting printing, the conventional printing system does not consider any print attribute for determining a print format set in a print job before and after interruption of the print job. The print data may be output in a format different from the result intended by the user. For example, when double-sided printing is designated as a print job attribute and the re-print start page is an even-numbered page, a content which should be printed on the reverse of the print page in normal double-sided printing is printed on the obverse. Combinations of pages of print data to be printed on obverses and reverses change and differ from the result expected by the user.

When stapling processing is designated for a print job, the user expects stapling every copy. However, a copy from which pages preceding to the re-print start page of the document are omitted is stapled, which differs from the result intended by the user.

SUMMARY OF THE INVENTION

The present invention has been made to overcome the conventional drawbacks, and has as its object to obtain an output faithful to the result expected by the user by controlling the re-print start page of a print job in accordance with an attribute set in the print job. To achieve the above object, an information processing apparatus and information processing method according to the present invention mainly have the following arrangements.

According to the present invention, the foregoing object is attained by providing an information processing apparatus which generates print data to be printed by a printer, comprising:

recognition means for recognizing generation of an error together with an error generation page in processing of a print job of a document when the document is to be printed;

determination means for determining a re-print start page in accordance with a print attribute and the error generation page of the print job interrupted by generation of the error; and data transfer means for transferring print data of a re-print range specified by the re-print start page determined by the determination means to a substitute printer which performs re-printing of the interrupted print job.

According to another aspect of the present invention, the foregoing object is attained by providing an information processing method of generating print data to be printed by a printer, comprising:

the recognition step of recognizing generation of an error together with an error generation page in processing of a print job of a document when the document is to be printed;

the determination step of determining a re-print start page in accordance with a print attribute and the error generation page of the print job interrupted by generation of the error; and the data transfer step of transferring print data of a re-print range specified by the re-print start page determined in the determination step to a substitute printer which performs re-printing of the interrupted print job.

In still another aspect of the present invention, the foregoing object is attained by providing an information processing apparatus which generates print data to be printed by a printer, comprising:

range setting means for setting a print range of each printer in order to distribute a print job to a plurality of printers and perform print processing;

recognition means for recognizing generation of an error in processing of each print range together with an error generation page within the print range when printing is performed in accordance with the print range set by the range setting means;

determination means for determining a re-print start page within the print range in accordance with a print attribute and the error generation page of the print job within the print range that is interrupted by generation of the error; and data transfer means for transferring print data of a re-print range specified by the determined re-print start page to a substitute printer which performs re-printing of the interrupted print range.

In still another aspect of the present invention, the foregoing object is attained by providing an information processing method of generating print data to be printed by a printer, comprising:

the range setting step of setting a print range of each printer in order to distribute a print job to a plurality of printers and perform print processing;

the recognition step of recognizing generation of an error in processing of each print range together with an error generation page within the print range when printing is performed in accordance with the print range set in the range setting step;

the determination step of determining a re-print start page within the print range in accordance with a print attribute and the error generation page of the print job within the print range that is interrupted by generation of the error; and the data transfer step of transferring print data of a re-print range specified by the determined re-print start page to a substitute printer which performs re-printing of the interrupted print range.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a view showing an example of a setting window in an automatic re-print algorithm;

FIGS. 11A and 11A are tables showing lists of book attributes;

FIG. 12 is a table showing a list of chapter attributes;

FIG. 13 is a table showing a list of page attributes;

FIG. 20 is a view showing an example of a distributed processing module setting window displayed on a CRT;

DETAILED DESCRIPTION OF THE PREFERRED EMBODIMENTS

Preferred embodiments of the present invention will now be described in detail in accordance with the accompanying drawings.

<General Description of System>

A document processing system as an embodiment suited to an information processing system of the present invention will be generally described with reference to FIGS. 9 to 19. This document processing system converts a data file created by a general application into an electronic original file by an electronic original writer. A bookbinding application provides a function of editing the electronic original file. Details of the system will be explained below.

<System Configuration and Operation>

Figure 9:
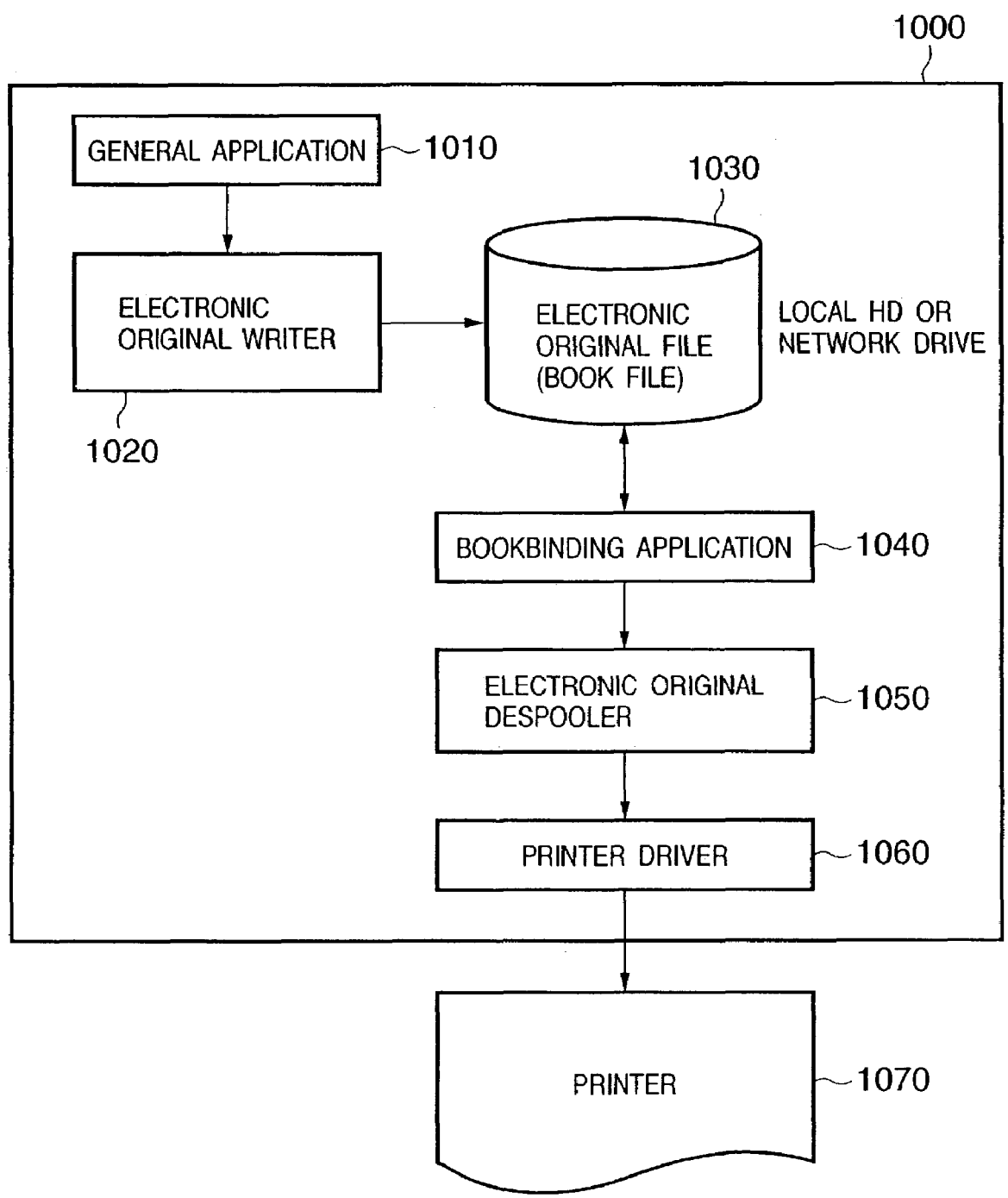
FIG. 9 is a block diagram showing a stand-alone document processing system.

FIG. 9 is a block diagram showing the software architecture of the document processing system according to this embodiment. The document processing system is implemented by a digital computer 1000 as an embodiment suited to the information processing apparatus of the present invention. A general application 1010 is an application program which provides functions such as wordprocessing, spreadsheet, photo-retouch, draw, paint, presentation, and text editing. The general application 1010 has a printing function corresponding to the OS. Such applications utilize a predetermined interface (generally called GDI) provided by the OS (Operating System) in printing application data such as created document data or image data.

To print created application data, the application 1010 transmits an output command (called a GDI function) which is determined in advance for the output module of the OS providing the interface and has an OS-dependent format. The output module which has received the output command converts the command into a format processible by an output device such as a printer, and outputs the converted drawing command (called a DDI function). Since the format processible by the output device changes depending on the type of device, the manufacturer, and the model, a device driver is provided for each device. The OS converts a command by using the device driver, generates print data, and combines print data by JL to generate a print job. When the OS is Microsoft Windows, the output module is a GDI module.

An electronic original writer 1020 is one of the above-mentioned device drivers, and is a software module provided to implement the document processing system. The electronic original writer 1020 does not target a specific output device, and converts an output command into a format processible by a bookbinding application 1040 or printer driver 1060 (to be described later). The format (to be referred to as an electronic original format hereinafter) converted by the electronic original writer 1020 is not particularly limited as far as each original page can be expressed by a detailed format. Of substantial standard formats, for example, the PDF format by Adobe Systems and the SVG format can be adopted as electronic original formats (intermediate file format data).

When the application 1010 utilizes the electronic original writer 1020, the electronic original writer 1020 is designated as a device driver used for output, and then caused to execute printing. An electronic original file created by the electronic original writer 1020 does not have a complete electronic original file format. For this reason, the electronic original writer 1020 is designated as a device driver by the bookbinding application 1040, and executes conversion of application data into an electronic original file under the management of the bookbinding application 1040. The bookbinding application 1040 completes a new incomplete electronic original file generated by the electronic original writer 1020 as an electronic original file having the following format.

In case of necessity to definitely discriminate these files, a file created by the electronic original writer 1020 will be called an electronic original file, and an electronic original file (also referred to as an intermediate code) given a structure by the bookbinding application will be called a book file. If these files need not be particularly discriminated, a document file generated by an application, an electronic original file, and a book file are called document files (or document data).

As described above, the electronic original writer 1020 is designated as a device driver, and the general application 1010 prints the data. Application data is converted into an electronic original format in pages (to be referred to as logical pages or original pages hereinafter) defined by the application 1010. The converted data is stored as an electronic original file 1030 in a storage medium such as a hard disk. The hard disk may be the local drive of the computer which implements the document processing system of this embodiment, or when the computer is connected to a network, may be a drive provided on the network.

The bookbinding application 1040 provides the user with a function of loading and editing the electronic original file or book file 1030. The bookbinding application 1040 provides no function of editing the contents of each page, but a function of editing a chapter or book structure (to be described later) made up of pages as a minimum unit.

To print the book file 1030 edited by the bookbinding application 1040, the bookbinding application 1040 activates an electronic original despooler 1050. The electronic original despooler 1050 reads out a designated book file from the hard disk. To print each page in a format described in the book file, the electronic original despooler 1050 generates an output command complying with the output module of the OS described above, and outputs the command to the output module (not shown). At this time, the printer driver 1060 of a printer 1070 used as an output device is designated as a device driver. The output module converts the output command received using the designated printer driver 1060 of the printer 1070 into a device command interpretable by the printer 1070. The device command is transmitted to the printer 1070, which prints an image corresponding to the command <Electronic Original Data Format>

Before the bookbinding application 1040 is described in detail, the book file data format will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may include a plurality of chapters, and one chapter may include a plurality of pages.

Figure 10A:
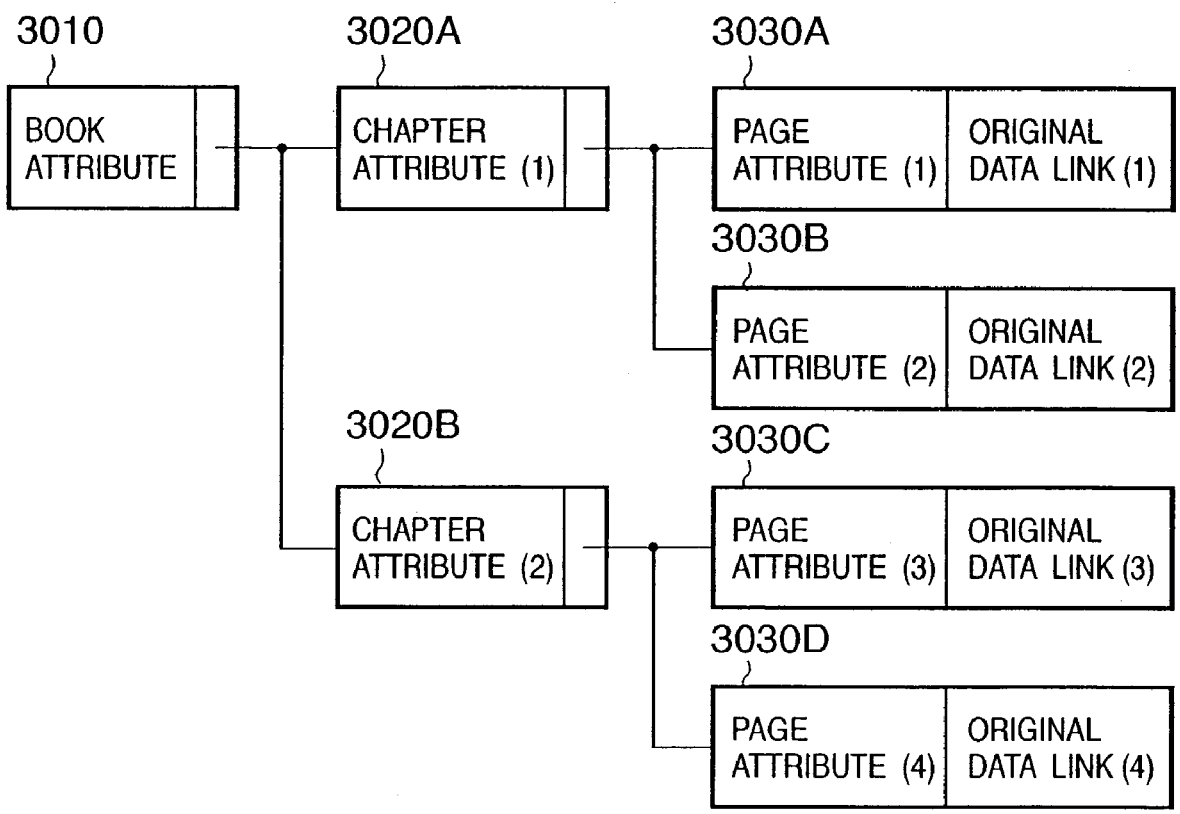
FIGS. 10A and 10B are views showing an example of book file structure.
Figure 10B:
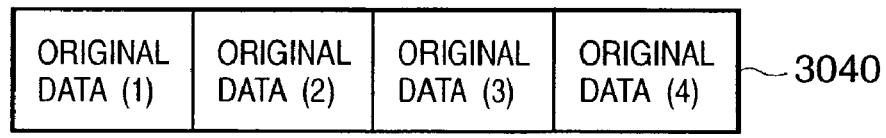

FIG. 10A is a block diagram schematically showing an example of the book file format. In the book file of this example, a book, chapter, and page are represented by corresponding nodes. One book file includes one book. The book and chapter are a concept for defining a book structure, and contain, as entities, defined attribute values and links to lower layers. The page has, as an entity, data of each page output from an application program. In addition to an attribute value, the page contains the entity of an original page (original page data) and a link to each original page data. In some cases, a print page to be output onto a paper medium or the like includes a plurality of original pages. This structure is displayed not by a link but by an attribute in the book, chapter, or page layer.

In FIG. 10A, a book 3010 defines a book attribute, and is linked to two chapters 3020A and 3020B. These links display that the chapters 3020A and 3020B are included in the book 3010. The chapter 3020A is linked to pages 3030A and 3030B, which represents that the chapter 3020A includes these pages. The pages 3030A and 3030B define attribute values, and contain links to original page data (1) and (2) serving as entities. These links represent data (1) and (2) of original page data 3040 shown in FIG. 10B, and display that the entities of the pages 3030A and 3030B are original page data (1) and (2).

FIGS. 11A and 11B show lists of book attributes. As for an item which can be defined repetitively on a lower layer, the attribute value of the lower layer is preferentially adopted. As for an item contained in only the book attribute, a value defined in the book attribute is effective over the book. An item repetitively defined on a lower layer is a default value used when this item is not defined in the lower layer. Each item shown in FIG. 11 does not always correspond to one concrete item, but may contain a plurality of relevant items.

FIG. 12 shows a list of chapter attributes, and FIG. 13 shows a list of page attributes. The relationship between chapter attributes and page attributes is the same as that between book attributes and lower layer attributes.

Items unique to book attributes are six items: printing method, details of bookbinding, front/back cover, index sheet, slip sheet, and chaptering. These items are defined over the book. As printing method attributes, three values: single-sided printing, double-sided printing, and bookbinding printing can be designated. "Bookbinding printing" is a method of printing data in a format which allows bookbinding by bundling a separately designated number of paper sheets, folding the bundle into two, and binding the bundle. As detailed bookbinding attributes, the opening direction and the number of paper sheets to be bundled can be designated when bookbinding printing is designated.

The front/back cover attribute includes designation of adding paper sheets serving as front and back covers when an electronic original file combined as a book is printed, and designation of contents to be printed on the added paper sheets. The index sheet attribute includes designation of inserting a tabbed index sheet separately prepared in a printing apparatus for chaptering, and designation of contents to be printed on the index (tabbed) portion. This attribute becomes effective when a printing apparatus to be used is equipped with an inserter having an inserting function of inserting a paper sheet prepared separately from a print paper sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new print page, or do nothing particular at a chapter break. In single-sided printing, the use of a new paper sheet and the use of a new print page are the same. In double-sided printing, a continuous chapter is not printed on one paper sheet if "the use of a new paper sheet" is designated, but may be printed on the obverse and reverse of one paper sheet if "the use of a new print page" is designated.

As for the chapter attribute, there is no item unique to the chapter, and all items overlap those of the book attribute. If the definition of the chapter attribute is different from that of the book attribute, a value defined by the chapter attribute precedes. Items common to only the book and chapter attributes are five items: paper size, paper direction, N-up printing designation, enlargement/reduction, and discharge method. The N-up printing designation attribute is an item for designating the number of original pages included in one print page. Layouts which can be designated are 1×1, 1×2, 2×2, 3×3, 4×4, and the like. The discharge method attribute is an item for designating whether to staple discharged paper sheets. The effectiveness of this item depends on whether the printing apparatus has a staple function.

Items unique to the page attribute are a page rotation attribute, zoom, layout designation, annotation, and page division. The page rotation attribute is an item for designating the rotation angle when an original page is laid out on a print page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header and footer are watermarks printed at the upper and lower margins of each page. For the header and footer, items such as a page number, and time and date which can be designated by variables are prepared. Contents which can be designated by the watermark attribute and header/footer attribute are common to the chapter and page, but are different in the book. The book can set the contents of the watermark and header/footer, and designate how to print a watermark or header/footer throughout the book. To the contrary, the chapter and page can designate whether to print a watermark or header/footer set by the book on the chapter or page.

<Book File Generation Procedures>

The book file has the above-described structure and contents. Procedures of creating a book file by the bookbinding application 1040 and electronic original writer 1020 will be explained. Creation of a book file is realized as part of book file editing operation by the bookbinding application 1040.

Figure 14:
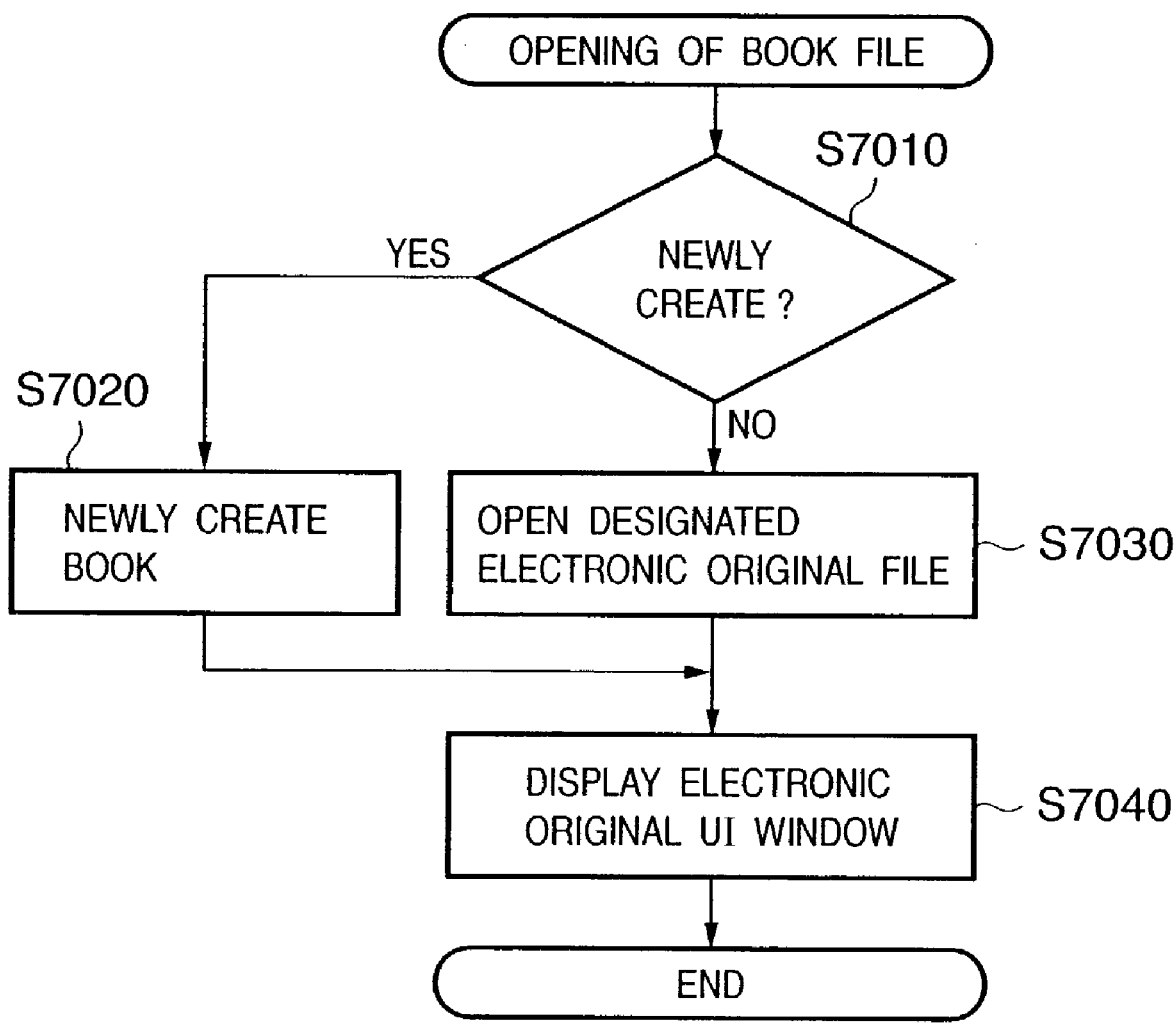
FIG. 14 is a flow chart showing procedures of opening a book file.

FIG. 14 shows procedures when the bookbinding application 1040 opens a book file.

Figure 18:
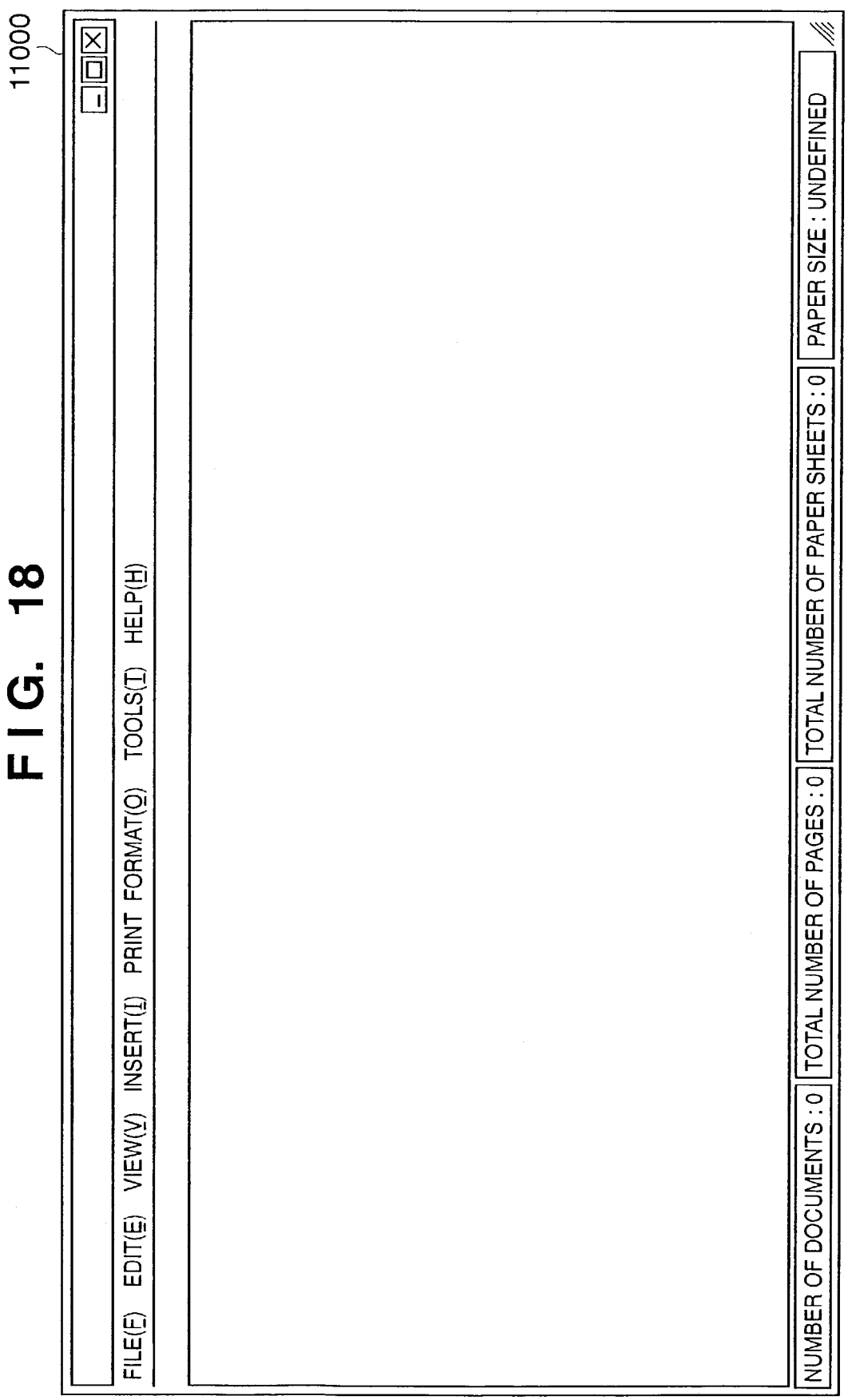
FIG. 18 is a view showing an example of a user interface window when a new book file is opened.

Whether a book file to be opened is one to be newly created or an existing one is checked (step S7010). If YES in step S7010, a book file including no chapter is newly created (step S7020). In the example shown in FIG. 10A, the newly created book file is a book node which has only the book node 3010 without any link to a chapter node. As the book attribute, a set of attributes prepared in advance for creation of a new book file are applied. A UI (User Interface) window for editing the new book file is then displayed (step S7040). FIG. 18 shows an example of the UI window when a book file is newly created. In this case, a UI window 11000 does not display any information because the book file does not have any substantial content.

Figure 17:
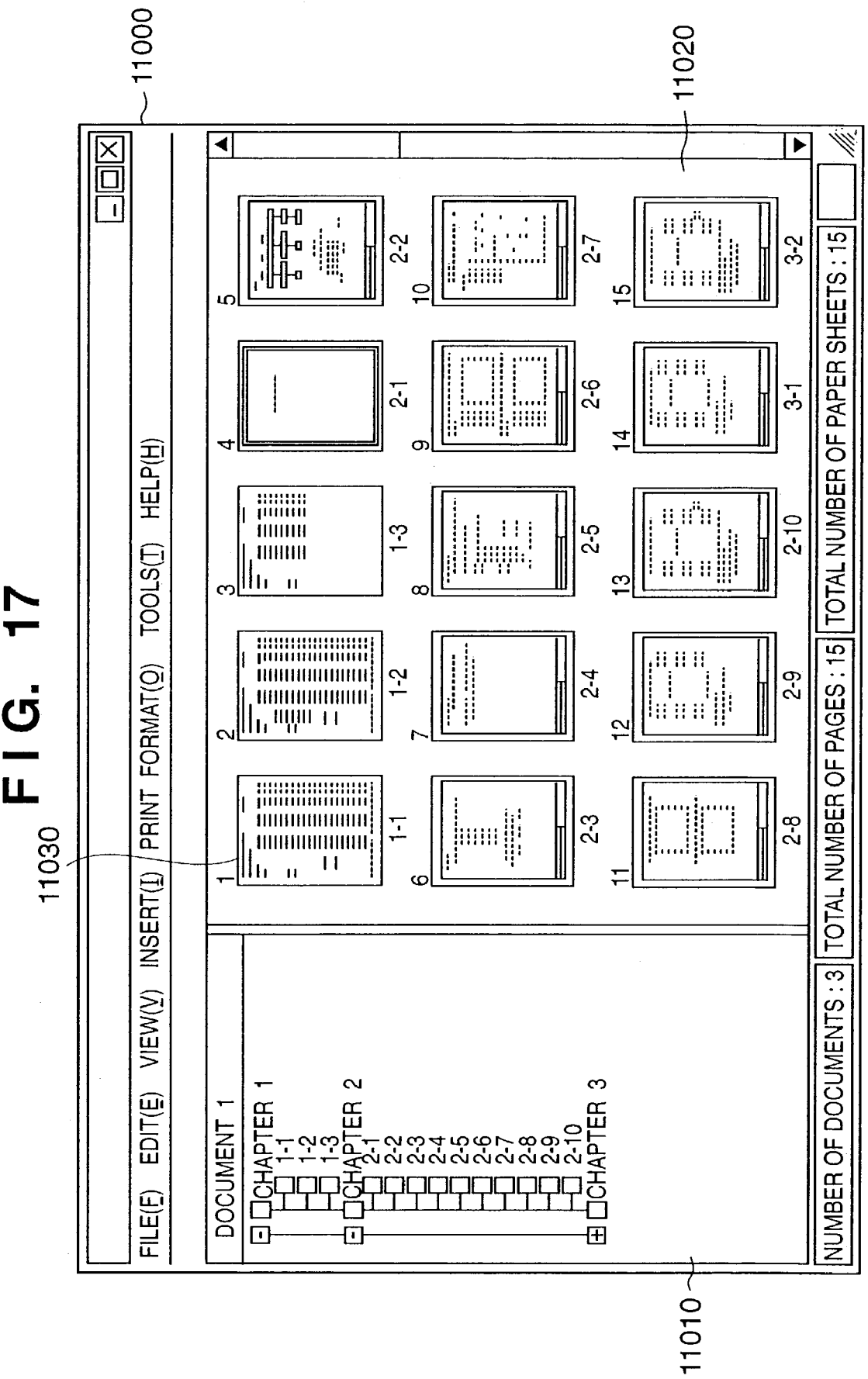
FIG. 17 is a view showing an example of a user interface window when an existing book file is opened.

If NO in step S7010, a designated book file is opened (step S7030), and a UI (User Interface) window is displayed in accordance with the structure, attribute, and contents of the book file. FIG. 17 shows an example of the UI window. The UI window 11000 has a tree portion 11010 representing a book structure, and a preview portion 11020 displaying a state to be printed. The tree portion 11010 displays chapters included in the book and pages included in each chapter by a tree structure as shown in FIG. 10A. Pages displayed at the tree portion 11010 are original pages. The preview portion 11020 displays reduced print page contents. The display order reflects the book structure.

Figure 15:
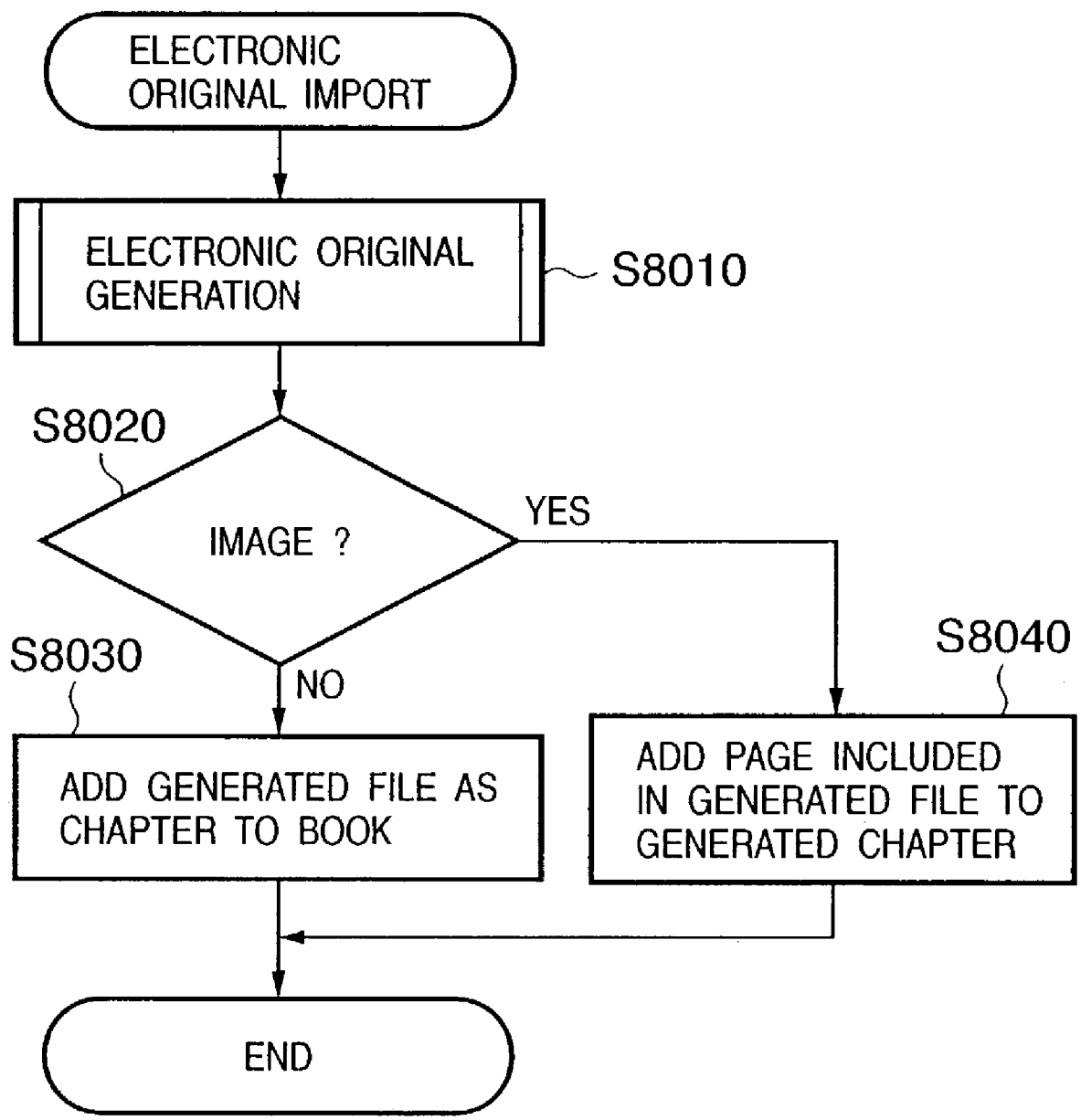
FIG. 15 is a flow chart showing procedures of importing an electronic original file into a book file.

Application data converted into an electronic original file by the electronic original writer can be added as a new chapter to the open book file. This function is called an electronic original import function. An electronic original is imported to the book file newly created by the procedures of FIG. 14, thereby giving an entity to the book file. This function is activated by drag-and-drop operation of application data to the window of FIG. 17. FIG. 15 shows electronic original import procedures.

An application program which has generated designated application data is activated. The electronic original writer 1020 is designated as a device driver, and prints out application data to convert it into electronic original data (step S8010). After conversion, whether the converted data is image data is checked (step S8020). This determination can be achieved based on the file extension of application data under the Windows OS. For example, an extension "bmp" represents Windows bitmap data; "jpg", jpeg-compressed image data; and "tiff", tiff-format image data. If YES in step S8020, processing in S8010 can be skipped because an electronic original file can be directly generated from image data without activating an application in S8010.

If NO in step S8020, the electronic original file generated in step S8010 is added as a new chapter to the book of a currently open book file (step S8030). As for the chapter attribute, an attribute common to a book attribute is set to a book attribute value, and a different attribute is set to a default value prepared in advance.

If YES in step S8020, no new chapter is added in principle, and each original page included in the electronic original file generated in step S8010 is added to a designated chapter (step S8040). For a file in which a book file is newly created, a new chapter is created, and each page of the electronic original file is added as a page belonging to the chapter. As for the page attribute, an attribute common to an upper layer attribute is given the attribute value of the upper layer attribute, and an attribute which is defined in application data and inherited to the electronic original file is given a value defined in the application data. For example, when N-up designation is defined in application data, the page inherits this attribute value. In this way, a new book file is created, or a new chapter is added.

Figure 16:
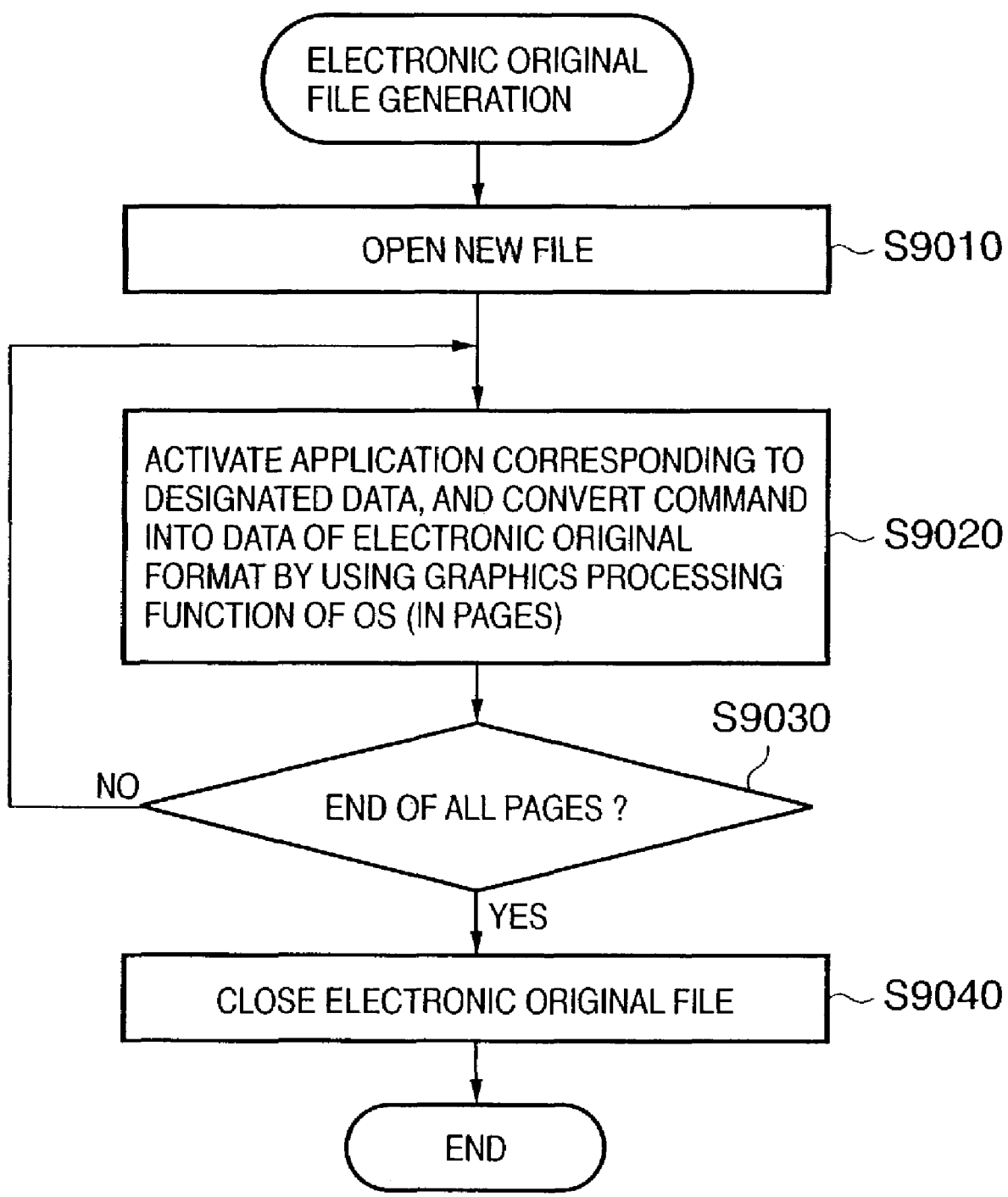
FIG. 16 is a flow chart showing procedures of converting application data into an electronic original file.

FIG. 16 is a flow chart showing procedures of generating an electronic original file by the electronic original writer 1020 in step S8010 of FIG. 15. A new electronic original file is created and opened (step S9010). An application corresponding to designated application data is activated. The electronic original writer is set as a device driver to transmit an output command to the output module of the OS. The output module converts the received output command into data of the electronic original format by the electronic original writer, and outputs the converted data (step S9020). The output destination is the electronic original file opened in step S9010. Whether all designated data have been converted is checked (step S9030), and if YES in step S9030, the electronic original file is closed (step S9040). The electronic original file generated by the electronic original writer 1020 is a file containing original page data entities shown in FIG. 10B.

<Editing of Book File>

As described above, a book file can be created from application data. The generated book file allows editing a chapter and page as follows.

(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page In addition, an operation of canceling executed editing operation, and an operation of restoring canceled operation can be performed. These editing functions enable editing operations such as consolidation of a plurality of book files, rearrangement of chapters and pages within a book file, delete of chapters and pages within a book file, layout change of an original page, and insertion of a slip sheet and index sheet. By these operations, operation results are reflected on attributes shown in FIGS. 11 to 18 or on a book file structure. For example, a blank page is inserted into a designated portion by an operation of newly adding a blank page. The blank page is processed as an original page. If the layout of an original page is changed, the change contents are reflected on attributes such as the printing method, N-up printing, front/back cover, index sheet, slip sheet, and chaptering.

<Output of Book File>

The ultimate goal of a book file created and edited in the above manner is to print it out. The user selects a file menu from the UI window 11000 of the bookbinding application shown in FIG. 17, and selects printing from this menu. The book file is then printed out from a designated output device. At this time, the bookbinding application 1040 creates a job ticket from a currently open book file, and transfers the job ticket to the electronic original despooler 1050. The electronic original despooler 1050 converts the job ticket into an OS output command, e.g., a Windows GDI command, and transmits the command to an output module, e.g., GDI. The output module generates a command complying with a device by a designated printer driver 1060, and transmits the command to the device.

The job ticket is data with a structure whose minimum unit is an original page. The structure of the job ticket defines the layout of an original page on paper. One job ticket is issued for one job. A document node is set at the top of the structure, and defines the attribute of the whole document such as double-sided printing/single-sided printing. A paper node belongs to the document node, and contains attributes such as the identifier of paper for use and designation of a feed port in the printer. A sheet node to be printed on the paper belongs to each paper node. One sheet corresponds to one paper sheet. A print page (physical page) belongs to each sheet. One physical page belongs to one sheet for single-sided printing, and two physical pages belong to one sheet for double-sided printing. An original page to be laid out on a physical page belongs to the physical page. The physical page attribute contains an original page layout.

The electronic original despooler 1050 converts the job ticket into an output command to the output module.

<Another System Configuration>

The document processing system of this embodiment has generally been described. This system is of stand-alone type. A server-client system as an extension of the stand-alone system also creates and edits a book file by almost the same arrangement and procedures. A book file and print processing are managed by the server.

Figure 19:
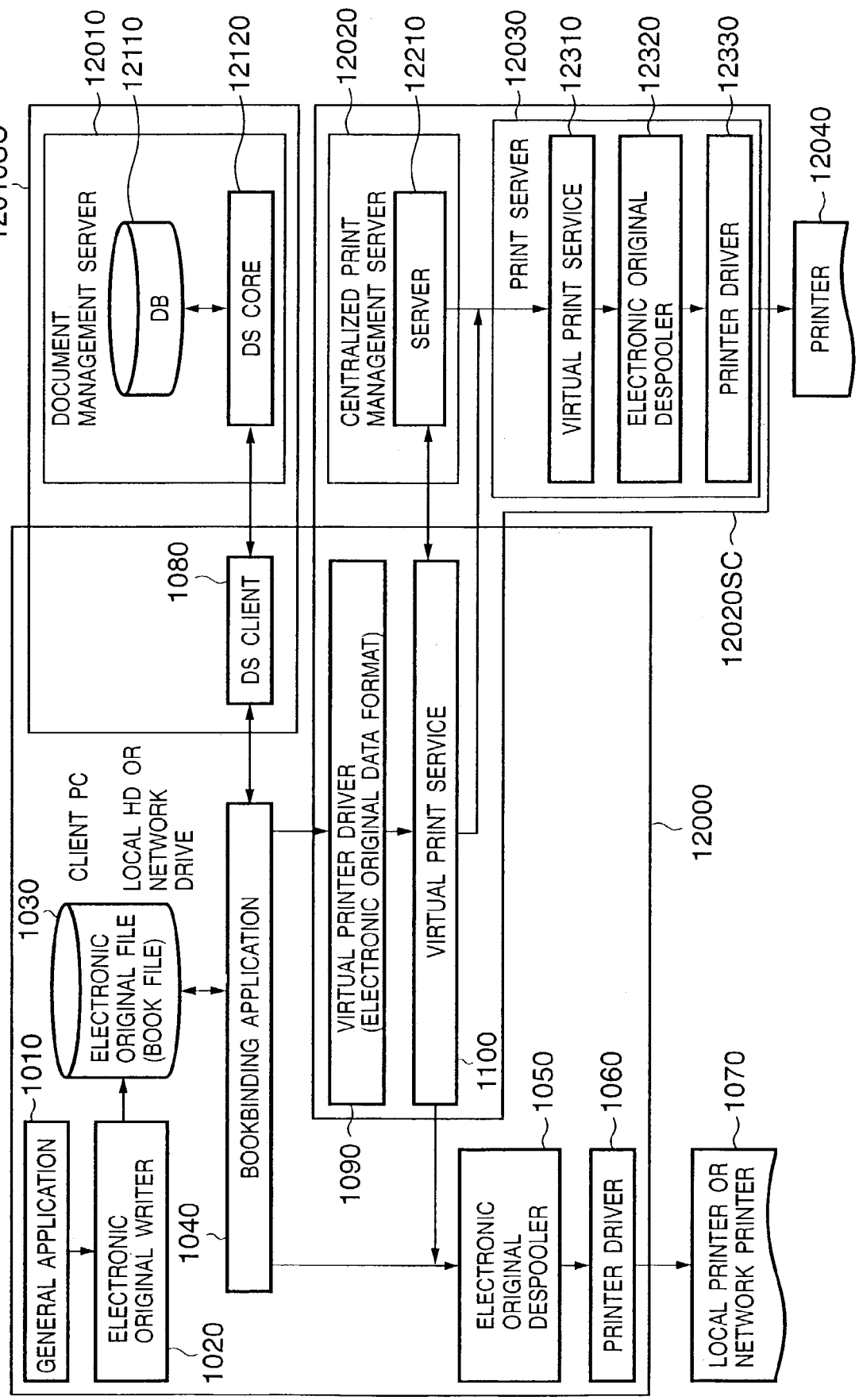
FIG. 19 is a block diagram showing a client-server document processing system.

FIG. 19 is a block diagram showing the arrangement of a server-client document processing system. The client document processing system is constituted by adding to the stand-alone system a virtual printer driver 1090 serving as a client module, a virtual print service module 1100, and a DS (Document Service) client module 1080. A client document processing system 12000 is connected to a document management server 12010, centralized print management server 12020, and print server 12030.

These servers are generally connected to the client document processing system via a network. When the servers also function as clients, they are connected by interprocess communication which simulates communication between networks. The document management server 12010 and centralized print management server 12020 are connected to the client in FIG. 19, but only either one may exist on the network. If the connected server is the document management server, a document management server-client system 12010SC including a client module is added to the stand-alone document management system. If the connected server is the centralized print management server 12020, a print management server-client system 12020SC including a client module is added.

The document management server 12010 stores a book file created and edited by the bookbinding application 1040. To manage a book file by the document management server 12010, the book file is saved in a database 12110 of the document management server 12010 instead of or in addition to the local HD of a client PC. Save and read of a book file between the bookbinding application 1040 and the document management server 12010 are done via the DS client module 1080 and a DS core 12120.

The centralized print management server 12020 manages printing of a book file stored in the client document processing system 12000 or document management server 12010. A print request from the client is transmitted to a server module 12210 of the centralized print management server 12020 via the virtual printer driver 1090 and virtual print service module 1100.

To print a book file by the printer of the client, the centralized print management server 12020 transfers electronic original data to the electronic original despooler 1050 via the virtual print service module 1100 of the client. To print a book file by the print server 12030, the centralized print management server 12020 transmits electronic original data to a virtual print service module 12310 of the print server 12030. For example, the centralized print management server executes security check on the qualification of a user who has issued a print request for a saved book file, or saves the print processing log. In this fashion, the document processing system can be implemented as both a stand-alone system and client-server system.

<Contents of Preview Display>

As described above, when the bookbinding application opens a book file, the user interface window 11000 shown in FIG. 17 is displayed. The tree portion 11010 displays a tree representing the structure of the opened book (to be referred to as a book of interest hereinafter). At the preview portion, three display methods are prepared in accordance with designation by the user. The first display method is an original view mode in which an original page is directly displayed. In the original view mode, the contents of an original page belonging to the book of interest are reduced and displayed. The display at the preview portion does not reflect the layout. The second display method is a print view mode. In the print view mode, the preview portion 11020 displays an original page which reflects the layout of the original page. The third display method is a simple print view mode. In the simple print view mode, the display at the preview portion reflects not the contents of each original page but only the layout.

<First Embodiment>

Preferred embodiments of the present invention will be described in detail below with reference to the accompanying drawings.

Figure 8:
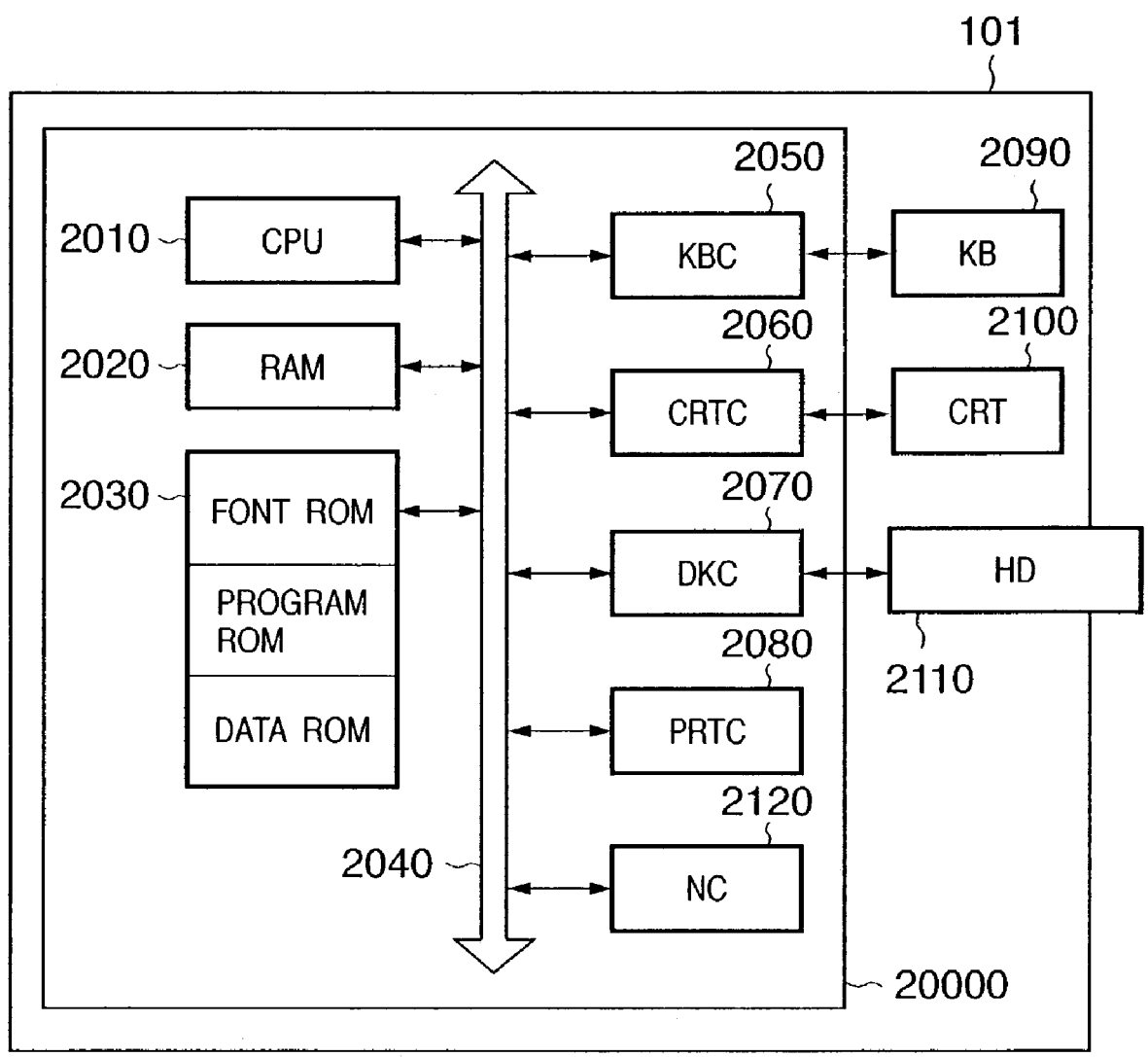
FIG. 8 is a block diagram showing the hardware of computer 101.

FIG. 8 is a block diagram showing the hardware of a computer 101. In FIG. 8, a CPU 2010 executes a program such as an OS, general application, or bookbinding application which is stored in the program ROM of a ROM 2030 or loaded from a hard disk 2110 to a RAM 2020, and realizes flow chart procedures (to be described later). The RAM 2020 functions as the main memory or work area of the CPU 2010. A keyboard controller (KBC) 2050 controls a key input from a keyboard 2090 or a pointing device (not shown).

A CRT controller (CRTC) 2060 controls the display on a CRT display 2100. A disk controller (DKC) 2070 controls access to the hard disk (HD) 2110 or floppy disk (FD) which stores a boot program, various applications, font data, user files, editing files (to be described later), and the like. A PRTC 2080 controls signal exchange with the connected printer 1070. An NC 2120 is connected to a network, and executes communication control processing with another device connected to the network.

Figure 1:
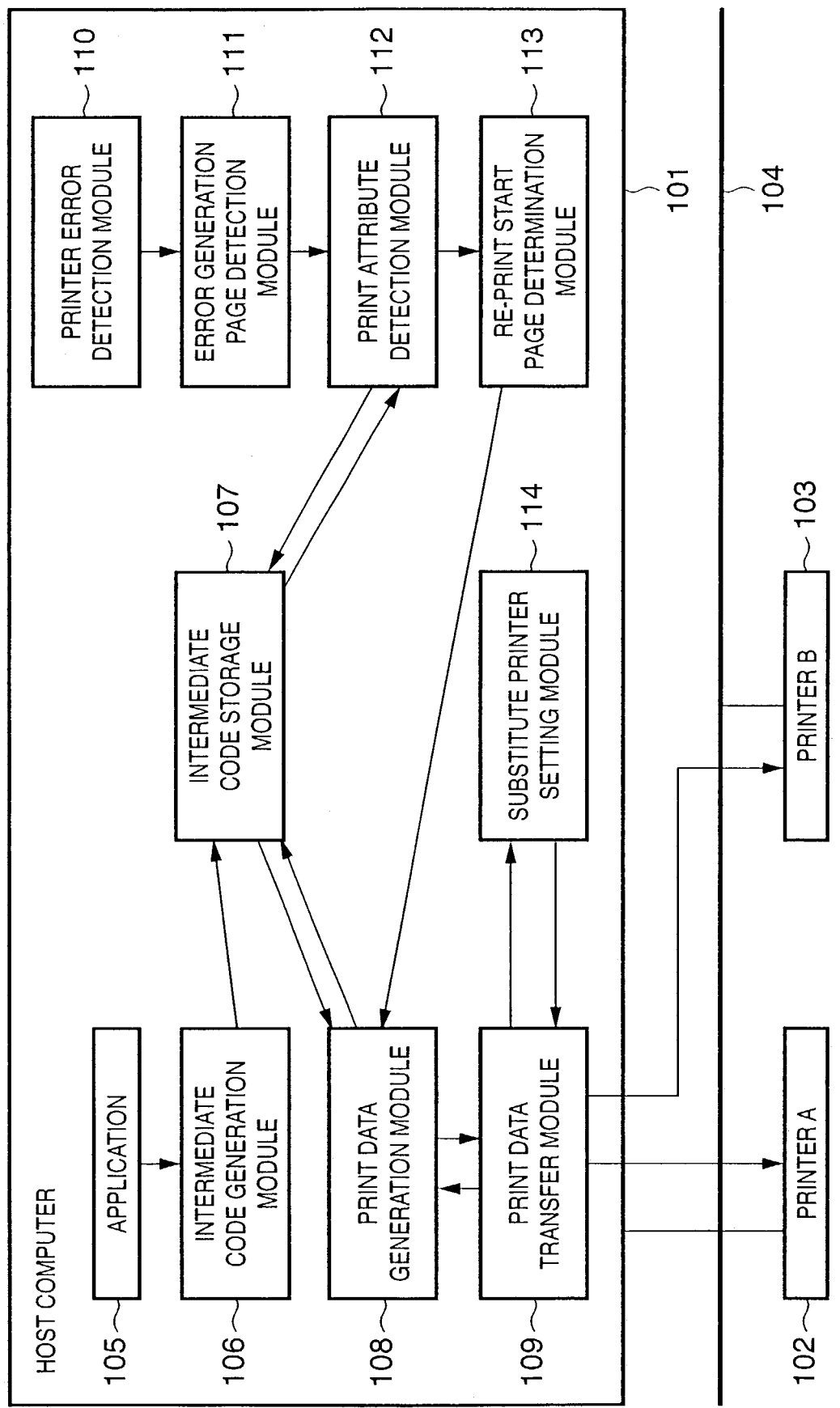
FIG. 1 is a block diagram showing the arrangement of an information processing system according to the first embodiment.

FIG. 1 is a block diagram showing the module arrangement of an information processing system according to the first embodiment. In FIG. 1, reference numeral 101 denotes a host computer which is connected to printers A and B (102 and 103) via a LAN 104. The host computer 101 and printers A and B can communicate data between them. Two printers are set as output destination printers in this arrangement, but the number of printers is not limited to this.

Reference numeral 105 denotes an application program (to be referred to as an "application" hereinafter) which provides functions such as wordprocessing, spreadsheet, and text editing. The application 105 issues a print request to an intermediate code generation module 106 to execute print processing to be described in the first embodiment.

The intermediate code generation module 106 (corresponding to the virtual printer driver 1090 in FIG. 19) receives a print request from the application 105, and generates an intermediate code containing image data such as EMF (intermediate file format data) or PDF which expresses the original of each page by a detailed format, and print attribute designation data such as DEVMODE or JDF. An intermediate code storage module 107 stores these data in a file. The application corresponds to the bookbinding application or the like in FIG. 19.

A print data generation module 108 (corresponding to the virtual print service 1100 in FIG. 19) receives a stored intermediate code from the intermediate code storage module 107, and converts the intermediate code into print data in a format such as PDL printable by an output destination printer. A print data transfer module 109 transfers the print data to the output destination printer via the LAN 104.

Although not shown in FIG. 1, the print data generation module 108 has a function of selecting from a predetermined memory unit a printer driver corresponding to a printer serving as a substitute destination or distributed destination from printer drivers corresponding to a plurality of printers, and a function of causing the print data transfer module 109 to transfer print data (PDL) generated using the selected printer driver to the substitute destination printer.

A printer error detection module 110 monitors the state of the output destination printer, determines whether a print job has normally been printed or an error occurs during printing, and notifies an error generation page detection module 111 of the determination result together with information about the numbers of printed pages. The state of the output destination printer is monitored by monitoring various error events (no paper, toner shortage, paper jam, full memory, and the like) or inquiring the state of the output destination printer by the error detection module 110. Error detection means processing of recognizing error information.

The error generation page detection module 111 specifies an error generation page by calculating an error generation page number from information about the numbers of pages printed by the output destination printer, on the basis of information sent from the printer error detection module 110.

A print attribute detection module 112 acquires (generates) the intermediate code of a print job corresponding to a page at which printing is interrupted by an error, from the intermediate code storage module 107 on the basis of information about the error generation page specified by the error generation page detection module 111. The print attribute detection module 112 acquires and recognizes print attribute information set in the print job.

A re-print start page determination module 113 determines an optimal re-print start page from the error generation page number received from the error generation page detection module 111 and print attribute information corresponding to the page, and sends the intermediate code and re-print start page to the print data generation module 108. The re-print start page determination module 113 designates, as a re-print-designated printer, a normal printer having a high priority on the basis of automatic re-print settings, and outputs a print instruction to the printer. The optimal re-print start page determination method will be explained with reference to FIGS. 3 to 7.

The print data generation module 108 specifies pages from the re-print start page to the final page of the print job as a re-print range on the basis of the re-print start page determined by the re-print start page determination module 113. The print data generation module 108 converts the intermediate code of this range into print data in a format such as PDL printable by the output destination printer. At this time, the print data generation module 108 can refer to the print data transfer module 109 for information about a substitute printer.

The print data is transferred by the print data transfer module 109 to a re-print destination printer specified as a substitute printer which performs re-printing of the interrupted print job.

In order to restart the print job interrupted by an error, a substitute printer setting module 114 sets substitute printers as re-print output destinations. The substitute printer setting module 114 sets the priorities of respective printers which perform re-printing. In accordance with the priorities, the print data transfer module 109 specifies a substitute printer which performs re-printing.

The application 105 and the modules (106 to 114) which constitute the information processing system are software modules provided to implement the information processing system, and need not always be mounted in the same host computer or the like. The modules (106 to 114) which constitute the information processing system may exist on the system server side, and the application 105 may exist on the system client side.

FIG. 2 is a view showing an example of a setting window in an automatic re-print algorithm displayed on the CRT 2100. In FIG. 2, an "output destination printer candidate" and the "priority" of the output destination are set. In the example shown in FIG. 2, "printer A" and "printer B" are set as the printer names of the output destinations, and given priorities "1" and "2". In this case, printer A with the priority "1" tries printing, and if an error occurs in printer A, printer B with the priority "2" executes re-printing. This may be set automatically by the substitute printer setting module 114, or set at any time by the manager or user via an input unit such as the keyboard (2090) in issuing a print request from an application.

The print data processing flow will be explained in detail with reference to the flow charts of FIGS. 3 to 7.

Figure 3:
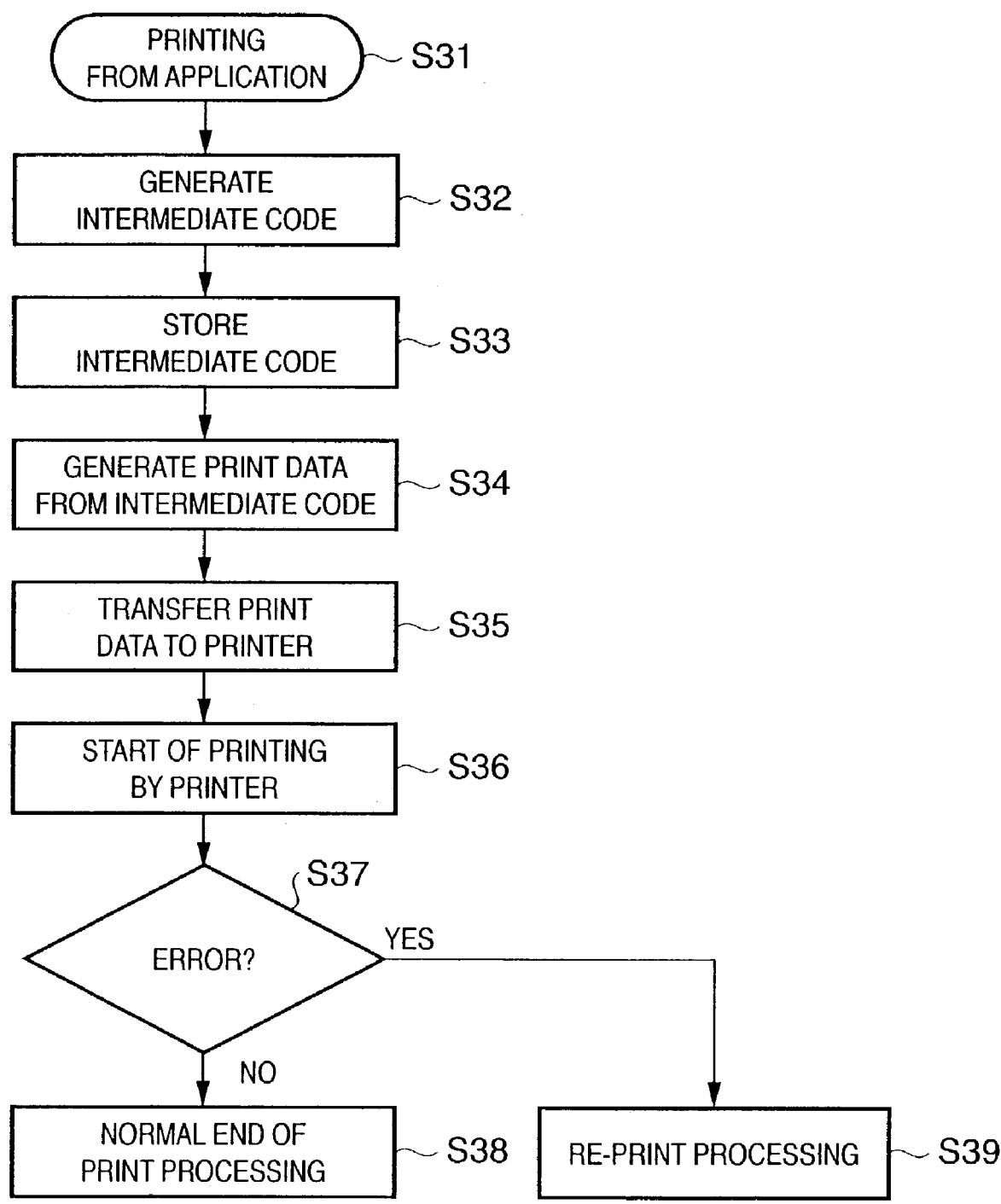
FIG. 3 is a flow chart for explaining a processing flow of performing printing by an application 105.

FIG. 3 is a flow chart for explaining a processing flow of performing printing by the application 105.

In step S31, the application 105 issues a print request to the intermediate code generation module 106 to start print processing.

In step S32, the intermediate code generation module 106 generates an intermediate code on the basis of the print request from the application 105. The intermediate code contains image data such as PDF, and print attribute designation data such as JDF, as described above. In step S33, the intermediate code storage module 107 stores the intermediate code in a file.

In step S34, the print data generation module 108 acquires the intermediate code from the intermediate code storage module 107, and converts the intermediate code into print data printable by an output destination printer having the highest priority. A predetermined interface module provided by the OS (Operating System) is utilized to print application data such as document data or image data created by the application 105. The intermediate code is converted into print data in a format processible by an output device such as a printer.

In step S35, the print data transfer module 109 receives the print data generated in step S34, and transfers the received data to the output destination printer via the LAN 104.

In step S36, the designated printer starts printing. The processing status of the printer is monitored by the printer error detection module 110 in FIG. 1 (S37). If print processing is normally completed without any error in print data processing, print processing normally ends (NO in S37; S38).

If an error occurs during print processing (YES in S37), the flow shifts to re-print processing operation shown in FIGS. 4 to 7 (S39).

Figure 4:
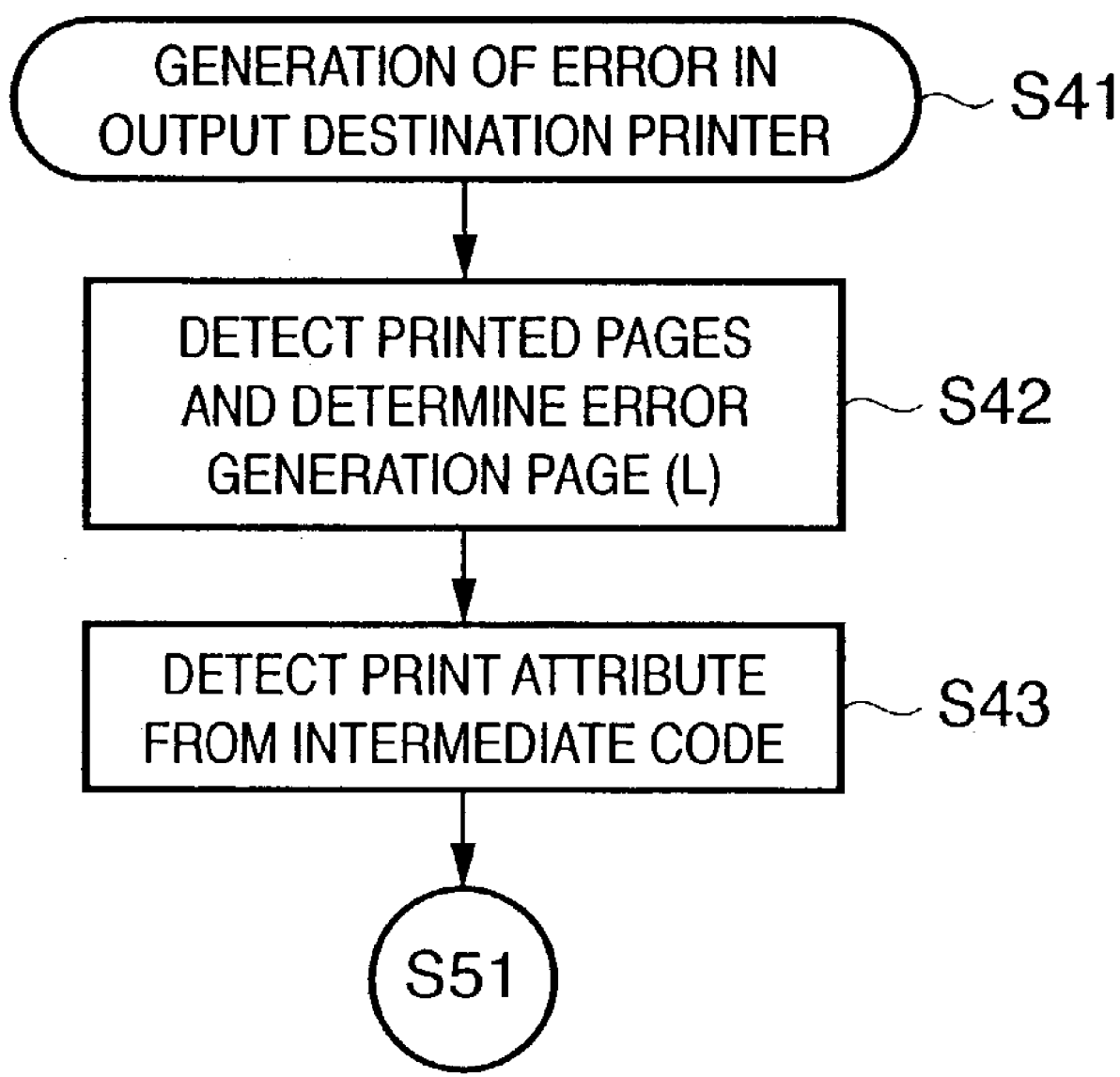
FIG. 4 is a flow chart for explaining re-print processing operation when an error is detected in a printer designated as an output destination.

FIG. 4 is a flow chart for explaining re-print processing operation when an error is detected in a printer designated as an output destination.

If the printer error detection module 110 detects generation of an error in the output destination printer (S41), the printer error detection module 110 acquires the numbers of printed pages (to be referred to as "print completion page numbers" hereinafter) before generation of the error in the printer. The error generation page detection module 111 determines an error generation page number (L) on the basis of the print completion page numbers.

The processing advances to step S43, and the print attribute detection module 112 detects a print attribute from an intermediate code DEVMODE, JDF, or the like stored in the intermediate code storage module 107. The print attribute includes an attribute representing whether data is obtained by repetitively arranging data of one copy in order to print a plurality of copies, an attribute representing whether stapling is designated, an attribute representing whether double-sided printing is set, an attribute representing whether bookbinding printing (which enables bookbinding by bundling a designated number of paper sheets, folding the bundle into two, and binding the bundle) is designated, and an attribute representing whether fascicle bookbinding (of forming a plurality of fascicles each obtained by stacking a designated number of paper sheets, saddle-stitching them, and folding the bundle into two) is designated. However, the print attribute is not limited to them.

Figure 5:
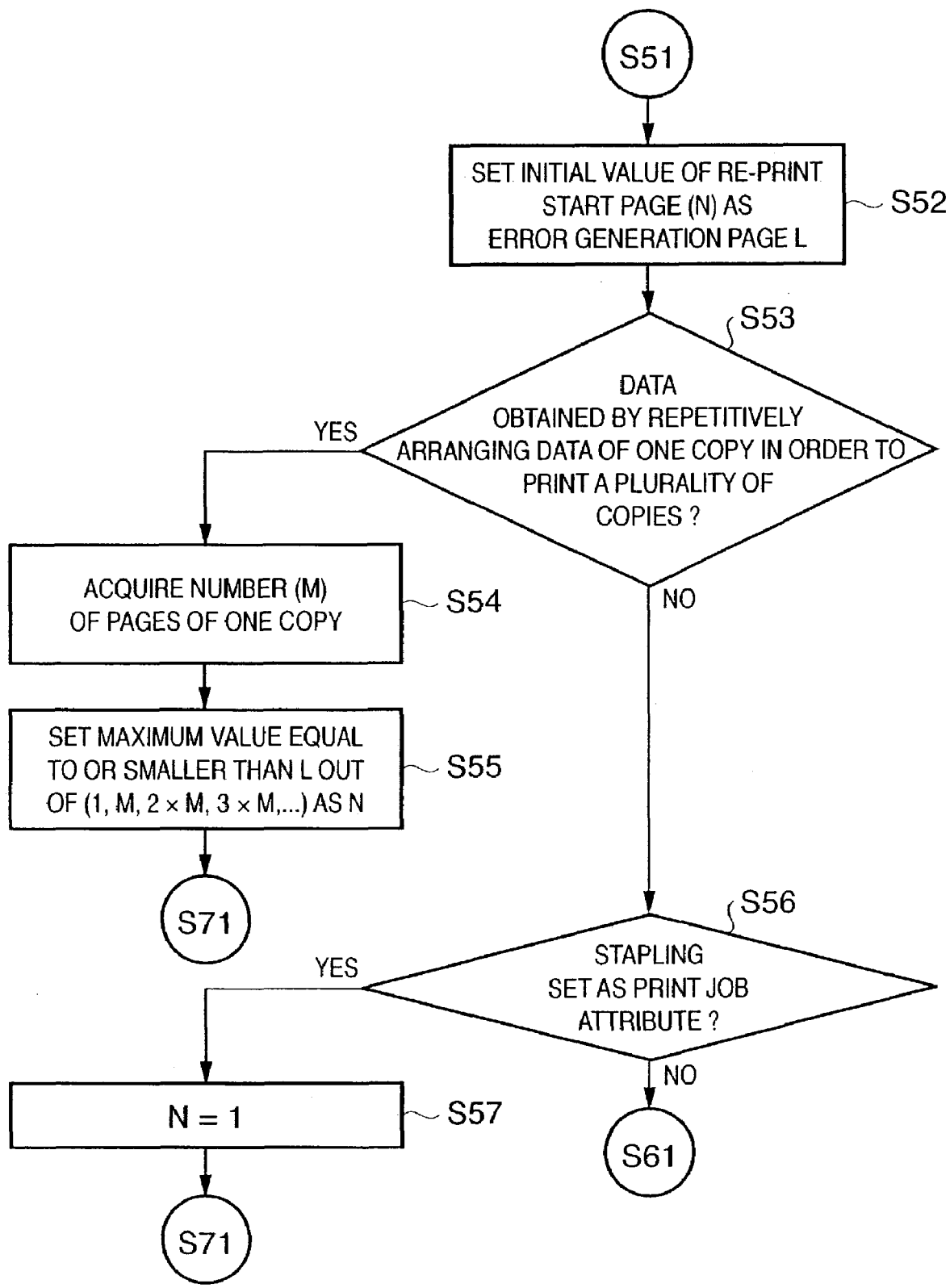
FIG. 5 is a flow chart for explaining re-print start page setting processing on the basis of the print attribute.

FIG. 5 is a flow chart for explaining re-print start page setting processing on the basis of the print attribute. After the print attribute is detected in step S43 of FIG. 4, the processing advances to step S52 of FIG. 5 to set the initial value of the re-print start page (N) as the error generation page number (L) determined in step S42 of FIG. 4.

In step S53, the print attribute acquired in step S43 is analyzed. If the intermediate code is obtained by repetitively arranging data in order to print a plurality of copies (YES in S53), the processing shifts to step S54; if NO, to step S56.

In step S54, the print job contains data for a plurality of copies, the number (M) of pages of one copy is acquired for re-printing of each copy, and the processing advances to step S55.

Figure 7:
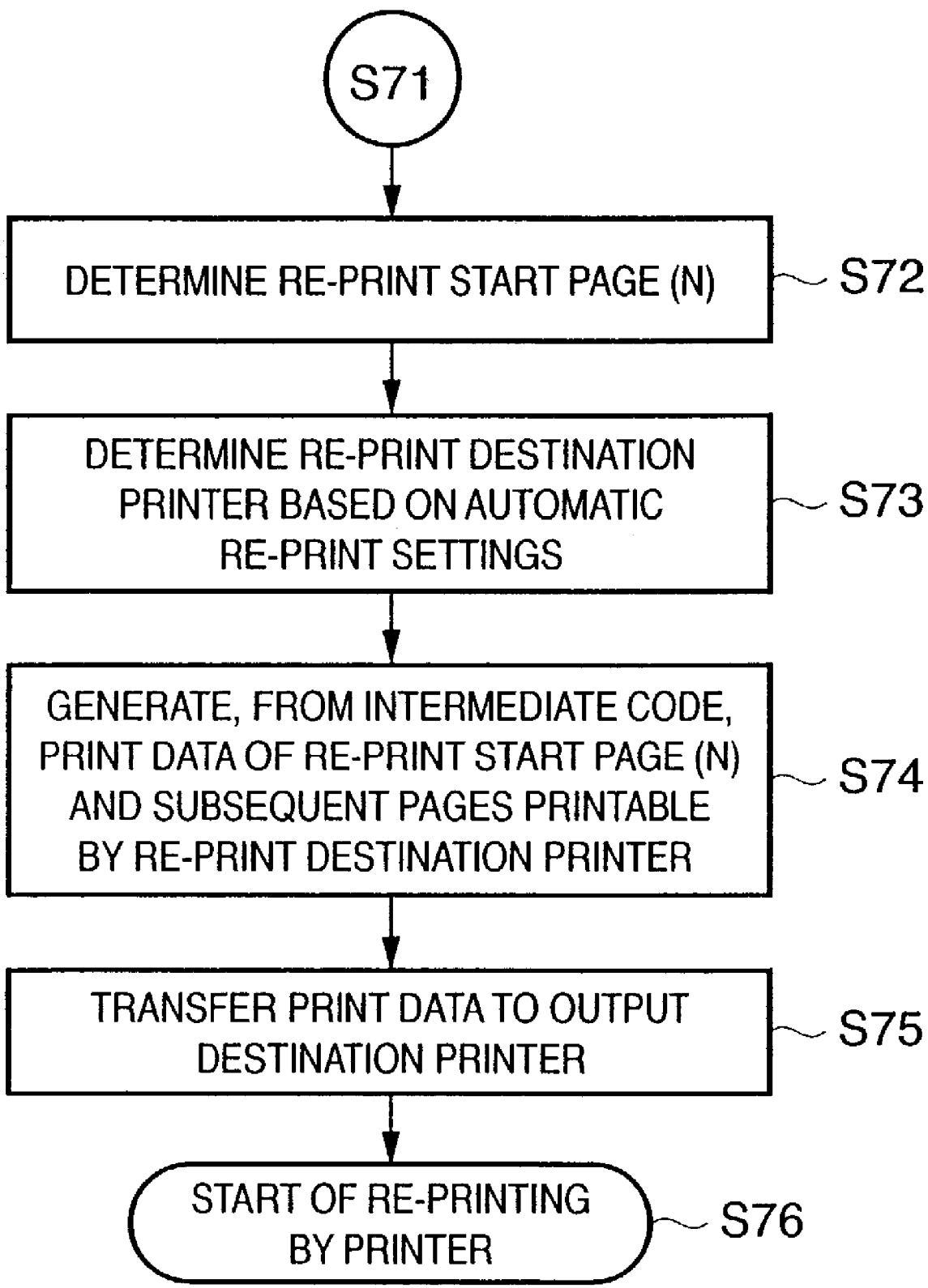
FIG. 7 is a flow chart for explaining processing from determination of a re-print start page to the start of re-printing.

In step S55, a sequence {1, M, 2×M, 3×M, . . . , NN× M . . . : (NN is a natural number)} is generated for determining the re-print start page N. Of the elements of this sequence, a maximum value which is equal to or smaller than the error generation page number L is calculated. This value is set as the re-print start page N, and the processing shifts to step S71 (FIG. 7).

In step S56, whether stapling is designated as the attribute (print attribute) of the print job is checked. If YES in step S56, the processing advances to step S57 to set the re-print start page N to 1 (S57), and advances to step S71 (FIG. 7). In processing of step S57, the re-print start page N is set to the first page because stapling is designated as a print job attribute and if re-printing starts in the middle of data of one copy, stapling of each copy fails.

Figure 6:
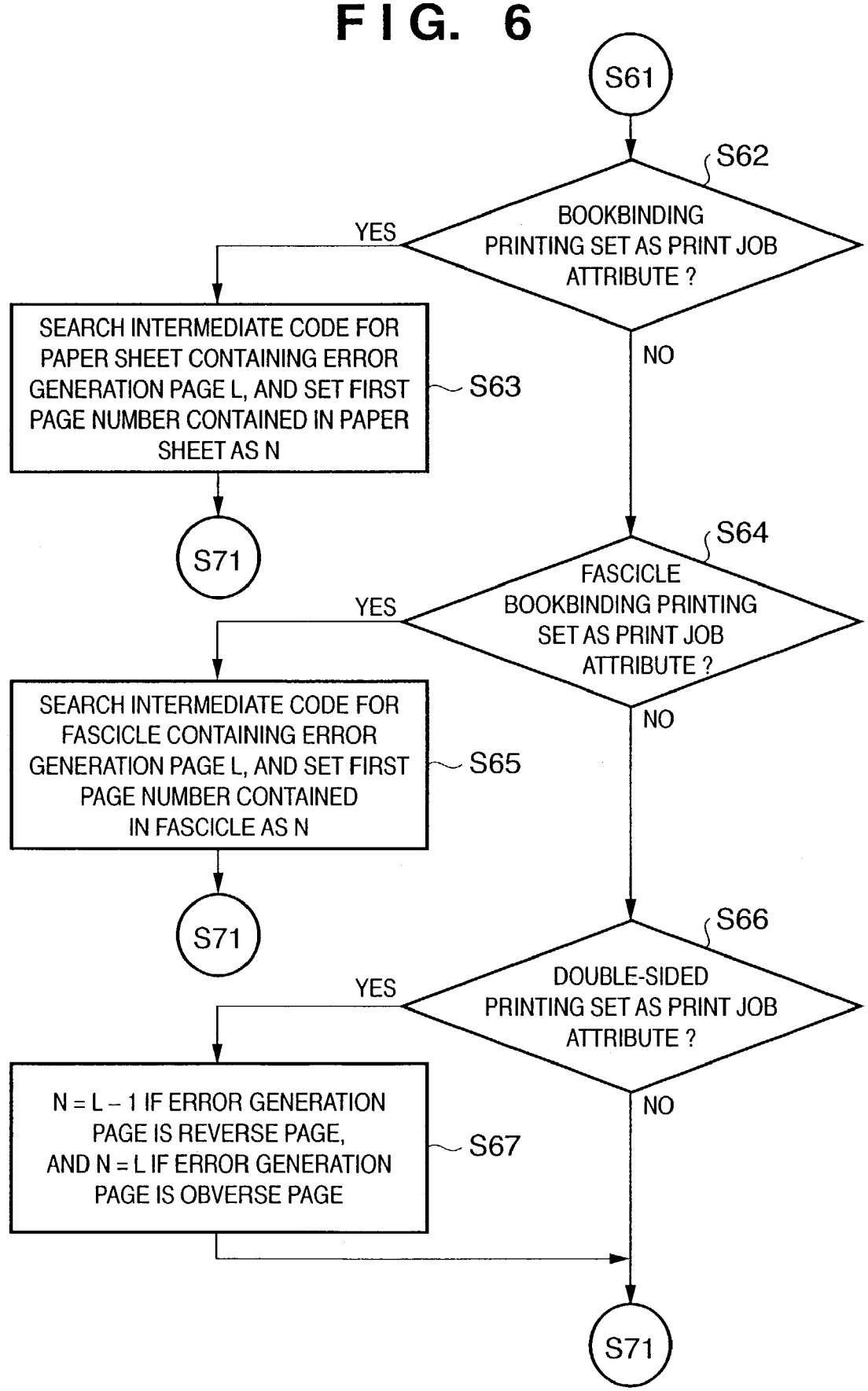
FIG. 6 is a flow chart for explaining re-print start page setting processing on the basis of the print attribute.

If NO in step S56, the processing shifts to step S61 (FIG. 6).

FIG. 6 is a flow chart for explaining re-print start page setting processing on the basis of print attributes concerning bookbinding printing, fascicle bookbinding printing, and double-sided printing. If no stapling is designated in step S56 of FIG. 5, whether the bookbinding printing attribute is set is checked in step S62 of FIG. 6. If YES in step S62, the processing shifts to step S63; if NO, to step S64.

In step S63, the intermediate code is used to search for a paper sheet containing the error generation page number L, and the first page number contained (laid out) in the paper sheet is set as the re-print start page N. The processing then advances to step S71 (FIG. 7).

In step S64, whether fascicle bookbinding printing is set as a print job attribute is checked. If YES in step S64, the processing shifts to step S65; if NO, to step S66.

In step S65, the intermediate code is used to search for a fascicle containing the error generation page number L, and the first page number contained in the fascicle is set as the re-print start page N. The processing then advances to step S71 (FIG. 7).

In step S66, whether double-sided printing is set as a print job attribute is checked. If YES in step S66, the processing shifts to step S67; if NO, to step S71 (FIG. 7).

In step S67, whether the error generation page L is to be printed on the obverse or reverse of an output paper sheet is checked. If the error generation page L is to be printed on the obverse, the error generation page L is set as the re-print start page N. If the error generation page L is to be printed on the reverse, a value calculated by subtracting 1 from the error generation page L is set as N. This allows printing data on a reverse even when an error generation page is to be printed on a reverse.

FIG. 7 is a flow chart for explaining processing from determination of a re-print start page to the start of re-printing. In step S72 of FIG. 7, the re-print start page N based on the print attribute is finally determined.

In step S73, an output destination printer having the highest priority of all printers in a normal state is selected as a re-print destination printer on the basis of automatic re-print settings in the print job. The settings are based on printers and priorities set on the automatic re-print setting window in FIG. 2.

In step S74, the print data generation module 108 extracts an intermediate file within a range based on the re-print start page determined in step S72. The print data generation module 108 converts the extracted intermediate code into a format printable by the re-print destination printer, and generates print data from the re-print start page to the final page.

The print data transfer module 109 transfers the print data to the re-print destination printer via the LAN 104 in step S75, and the re-print destination printer starts re-printing (S76). In re-print destination printer determination processing, the print data is automatically transferred to the substitute destination printer set via the user interface in FIG. 2 described above. It is also possible as another preferred embodiment to display a user interface capable of selecting and designating a substitute destination printer in response to generation of an error, and select as a substitute destination a substitute destination printer selected and designated via the displayed user interface. Further, print data may be converted into PDL data printable by the selected printer to transfer the PDL data. Processing of converting print data into PDL data printable by the transfer destination data is realized by extracting printer driver software corresponding to the transfer destination from a predetermined storage means and activating the software. As described above, the print data generation module 108 has a function of selecting a printer driver corresponding to a target printer from printer drivers corresponding to a plurality of printers.

As described above, according to the first embodiment, when a print job is interrupted by a printer error or the like, a re-print start page is determined based on the print attribute. The print attribute before interruption can be maintained even in re-printing, and the print job can be achieved with the consistent print attribute.

<Second Embodiment>

An embodiment in which a print job is distributed and parallel-processed using a plurality of printers will be described. FIG. 20 is a view showing an example of the setting window of a processing module (not shown: to be referred to as a "distributed processing module" hereinafter) for controlling distributed processing displayed on a CRT 2100. In FIG. 20, a print range assigned to each printer is set on the basis of the setting of an "output destination printer" and the "ratio" of the output destination.

In the example shown in FIG. 20, three printers "printer A", "printer B", and "printer C" are displayed as selectable output destination printers. Of these printers, "printer A" and "printer B" are set to ratios of 30% and 70%, respectively. Settings to printer A and printer B give a control instruction of processing 30% of print data from the start by printer A and printing the remaining 70% by printer B.

Printer C assigned no ratio is used as a printer which performs re-printing upon occurrence of an error in printer A or B. These settings may be done in advance by the manager, user, or the like, or at any time by the user or the like via an input unit such as a keyboard (2090) in issuing a print request from an application.

In a method of setting a "ratio" to each output destination in FIG. 20, a ratio is designated. It is also possible that the ability information of the print speed (number of print sheets which can be output per predetermined time) is acquired from a printer driver corresponding to each of a plurality of distribution destinations or from an output destination device itself, and each output destination is assigned the number of print sheets proportional to the print speed in accordance with the acquired ability information.

The second embodiment assumes that the priority has actually been set, similar to the first embodiment shown in FIG. 2. The second embodiment is different from the first embodiment in that a printer with priority "1" corresponds to a plurality of printers serving as distributed job output destinations, and if an error occurs in any output destination and is recognized by the host computer, an output destination printer with priority "2" is employed as a substitute destination. As another form, the substitute destination printer of a distributed job may be manually selected on the basis of a user instruction.

"Printer A", "printer B", and "printer C" shown in FIG. 20 represent printers selected by a selection means. Information in which printer devices in progress and printer output destination ports assigned to the devices are set is added to printers A, B, and C. Pieces of setting information (attribute) set via the setting window of FIG. 20 are stored as set values in the above-described print attribute designation data.

The printer driver processing flow will be described in detail below with reference to the flow charts of FIGS. 21 to 25.

Figure 21:
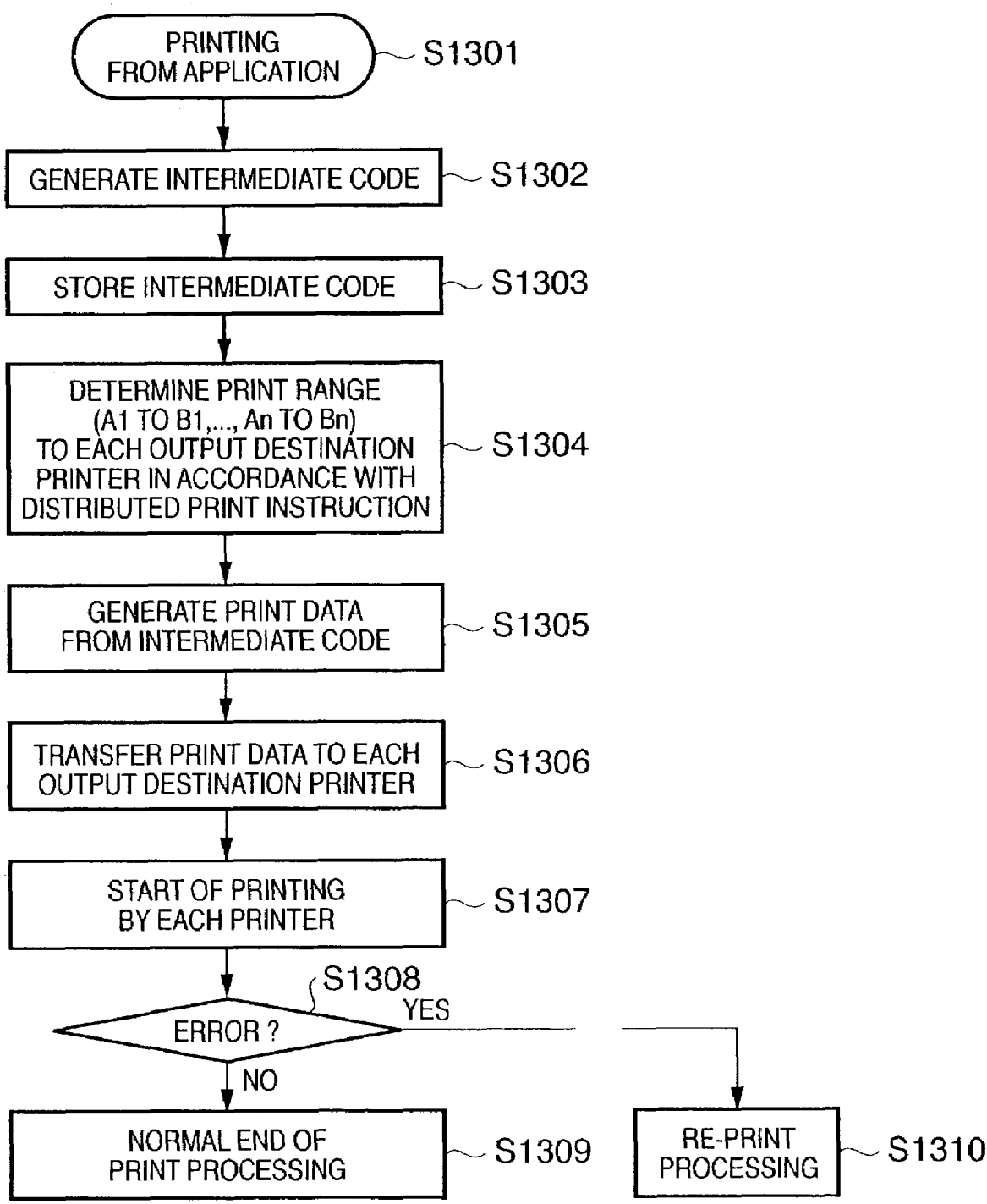
FIG. 21 is a flow chart for explaining a processing flow when the application 105 performs printing.

FIG. 21 is a flow chart showing a processing flow which is executed by a printing control system according to the second embodiment in response to a print request from an application 105. This flow is realized by executing processing based on a program loaded by the CPU of an apparatus from a nonvolatile memory means.

In step S1301, the application 105 issues a print request to an intermediate code generation module 106 to start print processing.

In step S1302, the intermediate code generation module 106 generates an intermediate code on the basis of the print request from the application 105. The intermediate code contains image data such as PDF, and print attribute designation data such as JDF, as described above. In step S1303, an intermediate code storage module 107 stores the intermediate code in a file.

In step S1304, a print range (ratio) is determined for each output destination printer on the basis of the settings of the distributed processing module. For example, in the settings shown in FIG. 20, the distributed processing module assigns printer A the first to third pages and printer B the fourth to 10th pages as print ranges of a print job representing print data of one copy of 10 pages. Pieces of information about the page ranges of distributed jobs are also written as set values in print attribute designation data corresponding to distributed destination printers (distributed destination printer drivers).

In step S1305, a print data generation module 108 acquires the intermediate code from the intermediate code storage module 107, and converts the intermediate code based on the print range of each output destination printer determined in S1304 into print data (page description language) printable by the output destination printer. In the second embodiment, printers A and B selected for distributed processing correspond to output destination printers. The print data generation module 108 generates, from intermediate codes, print data in formats processible by these printers.

Processing in step S1305 by the print data generation module 108 which generates print data complying with each output destination printer will be explained in more detail. The print data generation module 108 which has loaded the intermediate code from the intermediate code storage module comprises the above-described De-spooler function (1050 or 12320). The print data generation module 108 also comprises a function of converting intermediate code data (e.g., data in the SVG or PDF format described above) into an output command (drawing instruction) complying with the output module of the OS in order to allow the printer driver to interpret the intermediate code. The print data generation module 108 generates, for each distributed output destination, an output command (drawing instruction) based on a print page range set for print attribute designation data for each distributed output destination. The print data generation module 108 outputs a print instruction in order to cause a printer driver corresponding to each target output destination to print the generated output command. The printer driver which has received the print instruction generates print data (page description language) complying with the device.

In step S1306, a print data transfer module 109 receives the print data generated in step S1305, and transfers the received data to the output destination printer via a LAN 104. Although not shown in step S1306, processing of determining whether the transfer destination printer supports a completion notification is performed. If the printer is determined to support a completion notification, the host computer instructs the printer to issue a completion notification event.

In addition, the host computer executes control of omitting any designation to issue a completion notification event when the printer is determined not to support any completion notification or it is uncertain whether the printer supports it. The case where it is uncertain whether the printer supports a completion notification includes a case where the command system of any printer used for a distributed job is undefined (printer of another vendor).

The completion notification will be described in more detail. A plurality of completion notification forms are assumed, and the host computer designates issuing of a plurality of types of completion notifications supported by the printer. As the type of completion notification event, there are a print completion notification when all the print outputs of a job requested to the printer are normally completed, and a normal print completion notification (issued at a timing corresponding to normal discharge) every physical page. By determining by the host computer whether each output destination printer of a distributed job supports a completion notification, a normal distributed job mechanism is efficiently realized.

For example, when the host computer issues an instruction via a communication line to a printer which does not support a print completion notification instruction complying with a predetermined command system, the printer may malfunction. The "normal print completion notification every physical page" described above corresponds to processing in the following step S1403.

In this embodiment, information about the function of each output destination printer that is to be referred to by the host computer in determination may be acquired from the output destination printer via a communication line every determination. Alternatively, preset function information (information representing whether the printer supports a completion notification) may be referred to in determination.

Referring back to FIG. 20, the designated printer starts printing in step S1307. The processing status of the printer is monitored by a printer error detection module 110 in FIG. 1 (S1408). If print processing is normally completed without any error in print data processing, print processing normally ends (NO in S1308; S1309).

If an error occurs during print processing by each output destination printer (YES in S1408), the flow shifts to re-print processing operation shown in FIGS. 22 to 25 (S1310).

Figure 22:
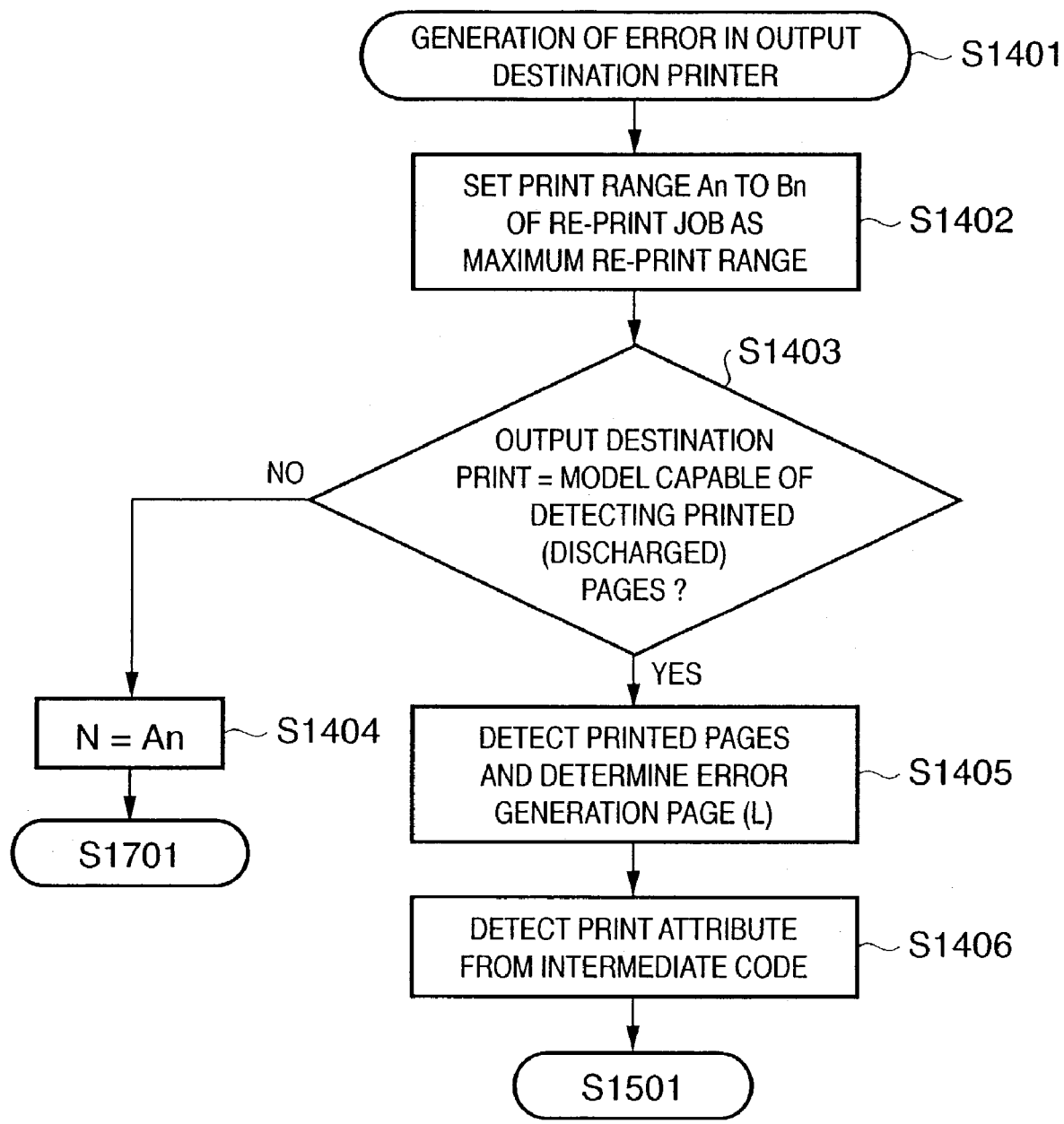
FIG. 22 is a flow chart for explaining re-print processing operation when an error is detected in a printer designated as an output destination.

FIG. 22 is a flow chart for explaining re-print processing operation when an error is detected in a printer designated as an output destination.

If the printer error detection module 110 detects generation of an error in the output destination printer (S1401), the printer suffering the error is specified using the printer ID or the like. Re-print processing of a print job which is being printed by the printer or waits for printing starts. If the print job to be printed again is determined, a re-print range from An to Bn is determined from the print range of each distributed print job obtained in step S1304, and defined as a maximum re-print range (S1402). For example, if an error occurs in printer B in the settings of FIG. 20, the maximum re-print range is from the fourth page to the 10th page.

The processing shifts to step S1403, and an error generation page detection module 111 checks whether the failed printer can detect the numbers of printed pages. If NO in step S1403, the re-print start page N is set to the start page An of the maximum re-print range, and the processing advances to step S1701 (S1404).

When one copy of 10 pages is processed at the distribution ratios set in FIG. 20, the re-print start page set in step S1404 is An=the first page for the print range of printer A and An=the fourth page for the print range of printer B.

If YES in step S1403, the printer error detection module 110 acquires the numbers of printed pages. The error generation page detection module 111 determines an error generation page number (L) on the basis of "the print completion page numbers+the value of the print start page An" (S1405).

The processing advances to step S1406, and a print attribute detection module 112 detects a print attribute from an intermediate code DEVMODE, JDF, or the like stored in the intermediate code storage module 107. The print attribute includes an attribute representing whether data is obtained by repetitively arranging data of one copy in order to print a plurality of copies, an attribute representing whether stapling is designated, an attribute representing whether double-sided printing is set, an attribute representing whether bookbinding printing (which enables bookbinding by bundling a designated number of paper sheets, folding the bundle into two, and binding the bundle) is designated, and an attribute representing whether fascicle bookbinding (of forming a plurality of fascicles each obtained by stacking a designated number of paper sheets, saddle-stitching them, and folding the bundle into two) is designated. However, the print attribute is not limited to them.

Figure 23:
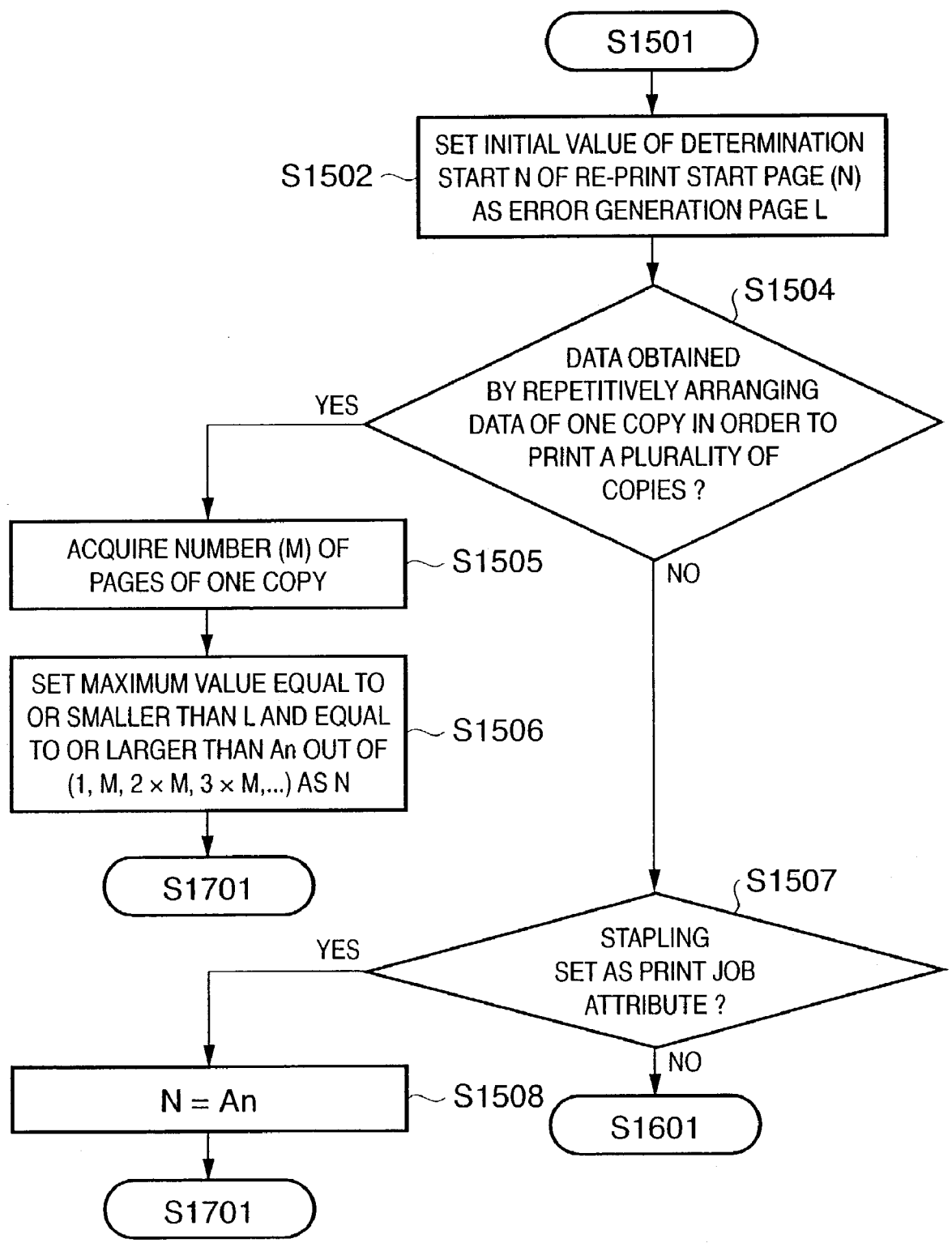
FIG. 23 is a flow chart for explaining re-print start page setting processing on the basis of the print attribute.

FIG. 23 is a flow chart for explaining re-print start page setting processing on the basis of the print attribute. After the print attribute is detected in step S1406 of FIG. 22, the processing advances to step S1502 of FIG. 23 to set the initial value of the re-print start page (N) as the error generation page number (L) determined in step S1405 of FIG. 22.

In step S1504, the print attribute acquired in step S1406 is analyzed. If the intermediate code is obtained by repetitively arranging data in order to print a plurality of copies (YES in S1504), the processing shifts to step S1505; if NO, to step S1507.

In step S1505, the print job contains data for a plurality of copies, the number (M) of pages of one copy is acquired for re-printing of each copy, and the processing advances to step S1506.

Figure 25:
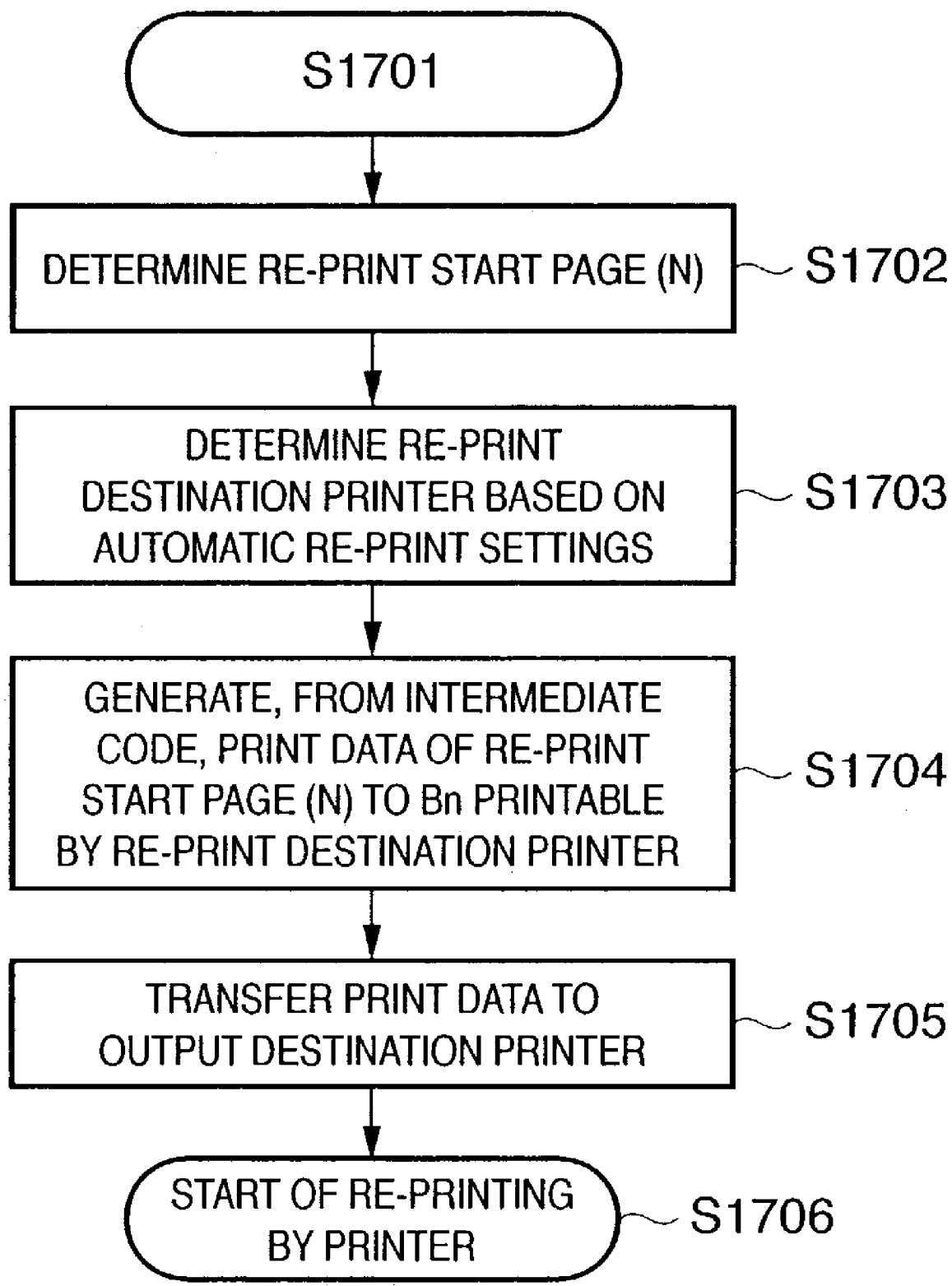
FIG. 25 is a flow chart for explaining processing from determination of a re-print start page to the start of re-printing.

In step S1506, a sequence {1, M, 2×M, 3×M, . . . , NN× M, . . . : (NN is a natural number)} is generated for determining the re-print start page N. Of the elements of this sequence, a maximum value which is equal to or smaller than the error generation page number L and is equal to or larger than the print start page An is calculated. This value is set as the re-print start page N, and the processing shifts to step S1701 (FIG. 25). In processing of step S1508, In step S1507, whether stapling is designated as the attribute (print attribute) of the print job is checked. If YES in step S1507, the processing advances to step S1508 to set the re-print start page N to the print start page An (S1508), and advances to step S1701 (FIG. 25). In processing of step S1508, the re-print start page N is set to the print start page An because stapling is designated as a print job attribute and if re-printing starts in the middle of data of one copy, stapling of each copy fails.

Figure 24:
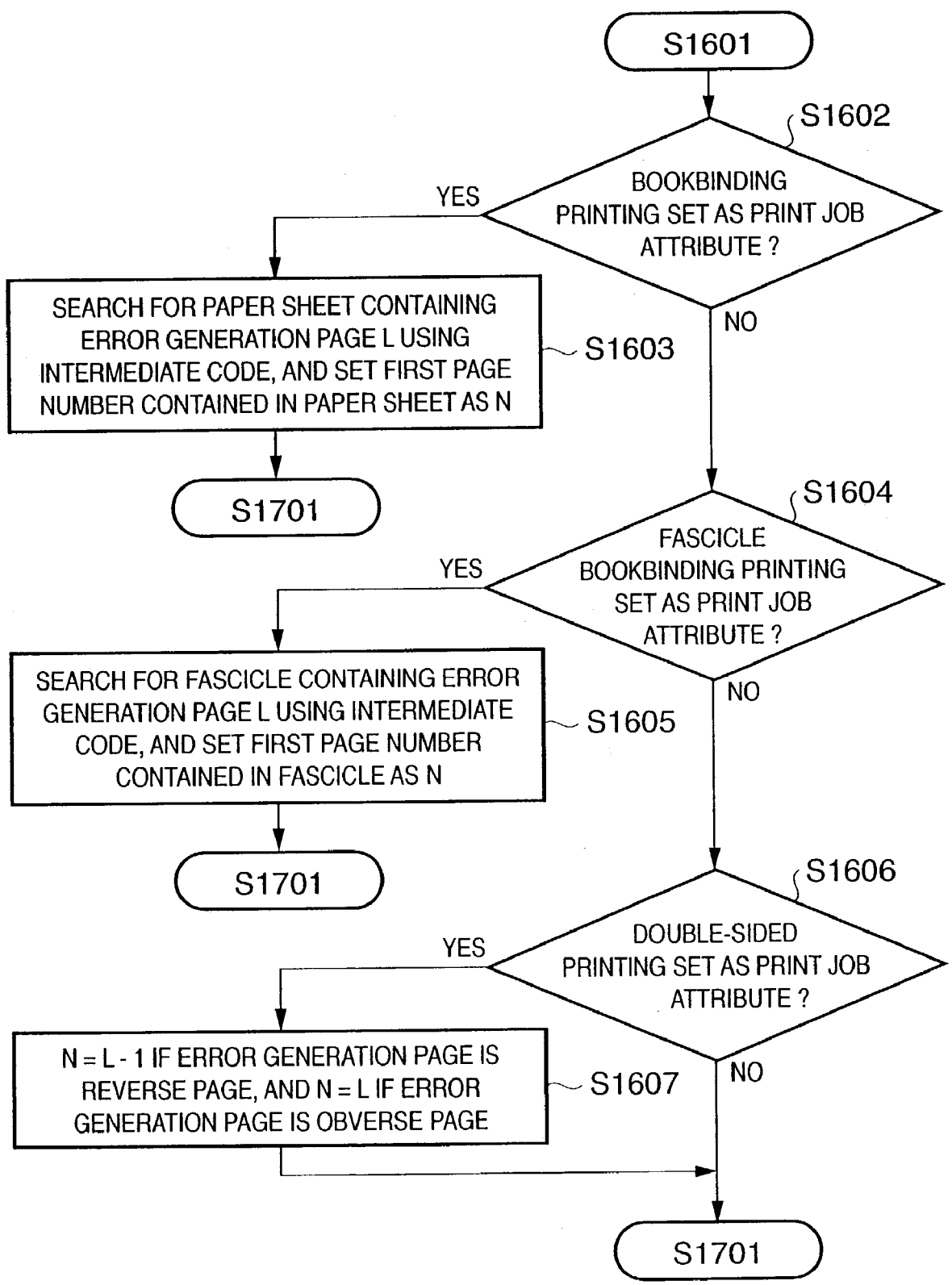
FIG. 24 is a flow chart for explaining re-print start page setting processing on the basis of print attributes concerning bookbinding printing, fascicle bookbinding printing, and double-sided printing.

If NO in step S1507, the processing shifts to step S1601 (FIG. 24).

FIG. 24 is a flow chart for explaining re-print start page setting processing on the basis of print attributes concerning bookbinding printing, fascicle bookbinding printing, and double-sided printing. If no stapling is designated in step S1507 of FIG. 23, whether the bookbinding printing attribute is set is checked in step S1602 of FIG. 24. If YES in step S1602, the processing shifts to step S1603; if NO, to step S1604.

In step S1603, the intermediate code is used to search for a paper sheet containing the error generation page number L, and the first page number contained (laid out) in the paper sheet is set as the re-print start page N. The processing then advances to step S1701 (FIG. 25).

In step S1604, whether fascicle bookbinding printing is set as a print job attribute is checked. If YES in step S1604, the processing shifts to step S1605; if NO, to step S1606.

In step S1605, the intermediate code is used to search for a fascicle containing the error generation page number L, and the first page number contained in the fascicle is set as the re-print start page N. The processing then advances to step S1701 (FIG. 25).

In step S1606, whether double-sided printing is set as a print job attribute is checked. If YES in step S1606, the processing shifts to step S1607; if NO, to step S1701 (FIG. 25).

In step S1607, whether the error generation page L is to be printed on the obverse or reverse of an output paper sheet is checked. If the error generation page L is to be printed on the obverse, the error generation page L is set as the re-print start page N. If the error generation page L is to be printed on the reverse, a value calculated by subtracting 1 from the error generation page L is set as N. This allows printing data on a reverse even when an error generation page is to be printed on a reverse.

FIG. 25 is a flow chart for explaining processing from determination of a re-print start page to the start of re-printing. In step S1702 of FIG. 25, the re-print start page N based on the print attribute is finally determined.

In step S1703, an output destination printer with priority "2" is employed as a substitute destination on the basis of the settings of a distributed processing module set in a print job. Instead of continuing print processing by automatically determining the output destination printer with priority "2" as a substitute destination, it is also possible as another form to display the output destination printer with priority "2" as a candidate in a selectable style to the user, and start re-print processing in response to an instruction input by the user such as click of an "OK" button. It is also possible to cause the user to determine every time a substitute destination printer from printers which can be referred to on a network, and use the determined substitute destination printer as a re-print printer. As still another form, a printer assigned no printing may be selected as a re-print destination printer. For example, in the settings of FIG. 20, printer C is selected. In this manner, the second embodiment assumes various substitute destination determination methods. With any substitute destination printer determination method, re-print page range processing shown in FIGS. 22 to 25 can be applied.

In step S1704, the print data generation module 108 extracts an intermediate file within a print range based on the re-print start page determined in step S1703. The print data generation module 108 converts the extracted intermediate code into a format printable by the re-print destination printer, and generates print data from the re-print start page N to the final page Bn of the maximum re-print range.

As another form of step S1704, when the substitute destination printer determined by the method described in the second embodiment is a model compatible with the original printer (printer suffering an error) or is an output apparatus of a model capable of interpreting the same page description language and control command, print data generated in step S1305 is held, and the held print data is used without generating print data from an intermediate code. The printing control system extracts print data corresponding to the print range and transfers the print data to the substitute destination printer. At this time, information about the correspondence between each output destination and print data or the function of each output destination is stored in the host computer in advance. The host computer refers to the stored information to determine whether to apply print data.

The print data transfer module 109 transfers the print data to the re-print destination printer via the LAN 104 in step S1705, and the re-print destination printer starts re-printing (S1706). In re-print destination printer determination processing, the print data is automatically transferred to the substitute destination printer set via the user interface in FIG. 20 described above.

It is also possible as another preferred embodiment to display a user interface capable of selecting and designating a substitute destination printer in response to generation of an error, and select as a substitute destination a substitute destination printer selected and designated via the displayed user interface. Furthermore, print data may be converted into PDL data printable by the selected printer to transfer the PDL data. Processing of converting print data into PDL data printable by the transfer destination data is realized by extracting printer driver software corresponding to the transfer destination from a predetermined storage means and activating the software. As described above, the print data generation module 108 has a function of selecting a printer driver corresponding to a target printer from printer drivers corresponding to a plurality of printers.

In the above description, the host computer comprises the functions of the print data generation module 108 and print data transfer module 109. As another form, the functions of the print data generation module 108 and print data transfer module 109 may be given to a server (e.g., corresponding to 12020 in FIG. 19) communicable with the host computer via a predetermined communication medium such as a network.

As described above, according to the second embodiment, when the printer which processes a print job by distributed processing interrupts processing by an error or the like, the print range of distributed printing and a re-print start page are determined based on the print attribute. The print attribute before interruption can be maintained every print range of distributed printing, and re-printing can be achieved with the consistent print attribute.

<Other Embodiment>

The present invention may be applied to a system constituted by a plurality of devices (e.g., a host computer, interface device, reader, and printer) or an apparatus (e.g., a copying machine, printer, or facsimile apparatus) formed from a single device.

The object of the present invention is also achieved when a storage medium which stores software program codes for realizing the functions of the above-described embodiments is supplied to a system or apparatus, and the computer (or the CPU or MPU) of the system or apparatus reads out and executes the program codes stored in the storage medium.

In this case, the program codes read out from the storage medium realize the functions of the above-described embodiments, and the storage medium which stores the program codes constitutes the present invention.

The storage medium for supplying the program codes includes a floppy disk, hard disk, optical disk, magnetooptical disk, CD-ROM, CD-R, magnetic tape, nonvolatile memory card, and ROM.

The functions of the above-described embodiments are realized when the computer executes the readout program codes. Also, the functions of the above-described embodiments are realized when an OS (Operating System) running on the computer performs part or all of actual processing on the basis of the instructions of the program codes.

The functions of the above-described embodiments are also realized when the program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes.

As has been described above, according to the present invention, when a print job is interrupted by a printer error or the like, a re-print start page is determined based on the print attribute. The print attribute before interruption can be maintained even in re-printing, and the print job can be achieved with the consistent print attribute, attaining an output faithful to the result expected by the user.

According to the present invention, when the printer which processes a print job by distributed processing interrupts processing by an error or the like, the print range of distributed printing and a re-print start page are determined based on the print attribute. The print attribute before interruption can be maintained every print range of distributed printing, and re-printing can be achieved with the consistent print attribute, providing an output faithful to the result expected by the user.

As many apparently widely different embodiments of the present invention can be made without departing from the spirit and scope thereof, it is to be understood that the invention is not limited to the specific embodiments thereof except as defined in the claims.

What is claimed is:

1. An information processing apparatus which generates print data to be printed by a printer, comprising:
   recognition means for recognizing generation of an error together with an error generation page in processing of a print job of a document when the document is to be printed;
   determination means for determining a re-print start page in accordance with a print attribute and the error generation page of the print job interrupted by generation of the error; and
   data transfer means for transferring print data of a re-print range specified by the re-print start page determined by said determination means to a substitute printer which performs re-printing of the interrupted print job,
   wherein when bookbinding printing is detected to be set as the print attribute of the print job, said determination means sets the re-print start page as a first page of a paper sheet containing the error generation page.

2. An information processing apparatus which generates print data to be printed by a printer, comprising:
   recognition means for recognizing generation of an error together with an error generation page in processing of a print job of a document when the document is to be printed;
   determination means for determining a re-print start page in accordance with a print attribute and the error generation page of the print job interrupted by generation of the error; and
   data transfer means for transferring print data of a re-print range specified by the re-print start page determined by said determination means to a substitute printer which performs re-printing of the interrupted print job,
   wherein when fascicle bookbinding printing is detected to be set as the print attribute of the print job, said determination means searches for a fascicle containing the error generation page, and sets the re print start page as a first page of the fascicle.

3. An information processing method of generating print data to be printed by a printer, comprising:
   a recognition step of recognizing generation of an error together with an error generation page in processing of a print job of a document when the document is to be printed;
   a determination step of determining a re-print start page in accordance with a print attribute and the error generation page of the print job interrupted by generation of the error; and a data transfer step of transferring print data of a re-print range specified by the re-print start page determined in the determination step to a substitute printer which performs re-printing of the interrupted print job, wherein, when bookbinding printing is detected to be set as the print attribute of the print job, processing to set the re-print start page as a first page of a paper sheet containing the error generation page is executed in the determination step.

4. An information processing method of generating print data to be printed by a printer, comprising:

a recognition step of recognizing generation of an error together with an error generation page in processing of a print job of a document when the document is to be printed;

a determination step of determining a re-print start page in accordance with a print attribute and the error generation page of the print job interrupted by generation of the error; and a data transfer step of transferring print data of a re-print range specified by the re-print start page determined in the determination step to a substitute printer which performs re-printing of the interrupted print job, wherein, when fascicle bookbinding printing is detected to be set as the print attribute of the print job, processing to search for a fascicle containing the error generation page is executed, and processing to set the re-print start page as a first page of the fascicle is executed, in the determination step.

5. A computer-readable storage medium which stores codes of a computer-executable information processing program, comprising:

a recognition code of recognizing generation of an error together with an error generation page in processing of a print job of a document when the document is to be printed;

a determination code of determining a re-print start page in accordance with a print attribute and the error generation page of the print job interrupted by generation of the error; and a data transfer code of transferring print data of a re-print range specified by the re-print start page determined by processing of the determination code to a substitute printer which performs re-printing of the interrupted print job, wherein, when bookbinding printing is detected to be set as the print attribute of the print job, said determination module sets the re-print start page as a first page of a paper sheet containing the error generation page.

6. A computer readable storage medium which stores codes of a computer executable information processing program, comprising:

a recognition code of recognizing generation of an error together with an error generation page in processing of a print job of a document when the document is to be printed;

a determination code of determining a re-print start page in accordance with a print attribute and the error generation page of the print job interrupted by generation of the error; and a data transfer code of transferring print data of a re-print range specified by the re-print start page determined by processing of the determination code to a substitute printer which performs re-printing of the interrupted print job, wherein when fascicle bookbinding printing is detected to be set as the print attribute of the print job, said determination code searches for a fascicle containing the error generation page, and sets the re-print start page as a first page of the fascicle.

* * * * *

UNITED STATES PATENT AND TRADEMARK OFFICE
CERTIFICATE OF CORRECTION

PATENT NO. : 7,180,623 B2  Page 1 of 1
APPLICATION NO. : 10/304954
DATED : February 20, 2007
INVENTOR(S) : Kato It is certified that error appears in the above-identified patent and that said Letters Patent is hereby corrected as shown below:

TITLE PAGE, ITEM
(56) Foreign Patent Documents, "JP 11-212760  8/1999" should read
-- JP 11-212750 8/1999 --.

SHEET 12:
FIG. 11B, "BOOLBINDING" should read -- BOOKBINDING --.

COLUMN 17:
Line 25, "De-spooler" should read -- de-spooler --.

COLUMN 19:
Line 33, "In processing of step S1508," should be deleted.

Signed and Sealed this

Eighteenth Day of March, 2008

JON W. DUDAS
*Director of the United States Patent and Trademark Office*